US011933267B2

(12) United States Patent
Farb et al.

(10) Patent No.: US 11,933,267 B2
(45) Date of Patent: Mar. 19, 2024

(54) FLUID TURBINE SUPPORT SYSTEM FOR AN ANGLED ROOF

(71) Applicants: Mark Daniel Farb, Lawrence, NY (US); Irakli Baitish, Haifa (IL)

(72) Inventors: Mark Daniel Farb, Lawrence, NY (US); Irakli Baitish, Haifa (IL)

(73) Assignee: FLOWER TURBINES, INC., Lawrence, NY (US)

( * ) Notice: Subject to any disclaimer, the term of this patent is extended or adjusted under 35 U.S.C. 154(b) by 0 days.

(21) Appl. No.: 18/298,584

(22) Filed: Apr. 11, 2023

(65) Prior Publication Data
US 2023/0323861 A1    Oct. 12, 2023

Related U.S. Application Data

(60) Provisional application No. 63/329,898, filed on Apr. 12, 2022.

(51) Int. Cl.
F03D 13/20    (2016.01)
F03D 3/00    (2006.01)

(52) U.S. Cl.
CPC ............ *F03D 13/20* (2016.05); *F03D 3/005* (2013.01); *F05B 2240/211* (2013.01); *F05B 2240/9112* (2013.01)

(58) Field of Classification Search
CPC .... F03D 13/20; F03D 3/005; F05B 2240/211; F05B 2240/9112
See application file for complete search history.

(56) References Cited

U.S. PATENT DOCUMENTS

| 403,636 A | 5/1889 | Bitterly |
|---|---|---|
| 5,143,170 A | 9/1992 | Hunt et al. |
| 5,624,006 A | 4/1997 | Richardson, Jr. |
| 6,824,073 B1 | 11/2004 | Haney |
| 7,592,537 B1 | 9/2009 | West |

(Continued)

FOREIGN PATENT DOCUMENTS

| CN | 103683622 A | 3/2014 | |
|---|---|---|---|
| GB | 2440264 A | * 1/2008 | ............ F03D 13/20 |
| WO | 2013175035 A1 | 11/2013 | |

OTHER PUBLICATIONS

Blum, Franz, et al. "Device for providing a platform on the roof of a building", May 14, 2020, EPO, DE 102018128308-A1 (Year: 2020).*

(Continued)

*Primary Examiner* — Woody A Lee, Jr.
*Assistant Examiner* — Joshua R Beebe
(74) *Attorney, Agent, or Firm* — Finnegan, Henderson, Farabow, Garrett & Dunner LLP

(57) ABSTRACT

A support system may secure a wind turbine above an angled roof. The angled roof may have a first angled surface, an opposite second angled surface, and a peak between the first angled surface and the second angled surface. The support surface may have a first weighted ballast located along a portion of the first angled surface and a second weighted ballast located along a portion of the second angled surface. The support system may have a connector extending between and connecting a portion of the first weighted ballast and a portion of the second weighted ballast. The connector may extend over the peak. The support system may have a mounting portion on the connector for securing a wind turbine to the connector. The first weighted ballast and the second weighted ballast may be sized and weighted to maintain the wind turbine above the peak during wind conditions.

24 Claims, 13 Drawing Sheets

(56) References Cited

U.S. PATENT DOCUMENTS

| | | |
|---|---|---|
| 2009/0220342 A1 | 9/2009 | Wu et al. |
| 2010/0252706 A1 | 10/2010 | Hargis |
| 2011/0037269 A1 | 2/2011 | Poon et al. |
| 2011/0164977 A1* | 7/2011 | Vallejo .................... F03D 3/061 416/223 R |
| 2011/0302864 A1* | 12/2011 | Ramsay ................ E04D 13/174 52/302.1 |
| 2011/0304150 A1 | 12/2011 | Hara |
| 2012/0175879 A1* | 7/2012 | Keech ....................... F03D 9/25 290/55 |
| 2013/0219812 A1 | 8/2013 | Goodman et al. |
| 2014/0150843 A1* | 6/2014 | Pearce ................ H01L 31/0203 136/244 |
| 2017/0074249 A1 | 3/2017 | Smook |
| 2020/0280281 A1* | 9/2020 | Vaidyanathan ......... H02S 20/23 |

OTHER PUBLICATIONS

Arias, Vega Fernando et al., "Mounting for Instruments on Buildings and Method for Installing Same", Oct. 15, 2012, ES-2388388-A1 (Year: 2012).*

Guetty, Richard Jean Claude, "Covering Element for Houses, Motor-Vehicles or the Like", Mar. 30, 2015, Romanian Patent Office, RO 130984A2 (Year: 2016).*

International Search Report and Written Opinion for International Application No. PCT/US2022/082035 dated Mar. 28, 2023 (8 pages).

International Search Report and Written Opinion, dated Sep. 13, 2023, issued in International Patent Application No. PCT/US2023/65612 (10 pages).

* cited by examiner

FLUID TURBINE SUPPORT SYSTEM FOR AN ANGLED ROOF

CROSS REFERENCES TO RELATED APPLICATIONS

This application claims the benefit of priority of U.S. Provisional Patent Application No. 63/329,898, filed on Apr. 12, 2022, the entire contents of which are incorporated herein by reference.

BACKGROUND

Technical Field

This disclosure generally relates to a fluid turbine support system and, more particularly, to a system for supporting a fluid turbine on an angled roof using weighted ballasts.

Background Information

As a result of the increasing challenges posed by climate change, more attention is being devoted to green energy alternatives to fossil fuels. The use of non-conventional energy sources such as solar energy or wind energy has become increasingly desirable to reduce reliance on conventional energy sources (e.g., fossil fuel-based power plants, nuclear power plants). Towards that end, solar panels are often attached to the roof of a building to harvest solar energy and generate electricity. The electricity generated by these solar panels may either be consumed by one or more appliances or equipment in the building or may be supplied back to the energy grid associated with delivering electricity generated using the conventional energy sources. Electricity can also be generated via wind turbines that convert the flow or air into electricity. However, such wind turbines are typically very large and are attached to the ground surface via standalone structures that enable the wind turbines to be positioned high above the ground surface. Conventionally, it has not been possible to attach such wind turbines to the roof of a building for electricity generation to the same degree as solar panels.

Attaching a wind turbine to a roof presents unique problems. A wind turbine typically extends vertically upwards to be able to receive a sufficient amount of air flow for rotation of the moving components of the wind turbine. However, the wind blowing across a wind turbine also generates horizontal forces that may tend to deflect the wind turbine. Furthermore, the horizontal forces exerted on a wind turbine attached to a roof may exert shear forces on the roof, which may cause the roof to be pulled off the side walls of the building, particularly when the wind velocity is extremely high. This is particularly dangerous if the wind turbine is bolted to the roof. Moreover, conventional wind turbines are heavy and attaching such wind turbines to a roof may add weight to the roof, which in turn may make the roof susceptible to damage. Conventional methods of attachment of the wind turbines to the roofs, using fasteners inserted into holes drilled in the trusses or beams of the roof, may also present problems. For example, the addition of holes in an existing roof may allow for leakage of water (e.g., rain water) through the fastener holes into the building. It is also a problem when re-roofing is needed, and bolted systems are more expensive to take off and put back on.

Therefore, there is a need for a system and method of installing small wind turbines on the roof of an existing building to allow for electricity generation using wind power without causing damage to the roof and/or without subjecting the roof to potential damage from water leakage or shear forces generated by the wind.

SUMMARY

Embodiments consistent with the present disclosure provide devices and systems for attaching one or more small fluid turbines to angled roofs of a building. Additionally, embodiments consistent with the present disclosure provide methods of attachment of the fluid turbines without the need for drilling holes in the roof or inserting fasteners into the roof. Embodiments consistent with the present disclosure provide devices and systems of attachment of the fluid turbines to angled roofs using weighted ballasts that also allow for the use of other energy generation devices like solar panels in combination with the wind turbines.

The foregoing and following examples are provided for the convenience of the reader to provide a basic understanding of such embodiments and do not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later.

Embodiments consistent with the present disclosure provide a support system for securing a wind turbine above an angled roof. The angled roof may have a first angled surface, an opposite second angled surface, and a peak between the first angled surface and the second angled surface. The system may include a first weighted ballast configured for location along a portion of the first angled surface. The system may further include a second weighted ballast configured for location along a portion of the second angled surface. The system may include at least one connector extending between and connecting a portion of the first weighted ballast and a portion of the second weighted ballast. The at least one connector may extend over the peak. The system may also include at least one mounting portion on the at least one connector for securing at least one wind turbine to the at least one connector. The first weighted ballast and the second weighted ballast may be sized and weighted to maintain the at least one wind turbine above the peak during wind conditions.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. The words "comprising," "having," "containing," and "including," and other similar forms are intended to be equivalent in meaning and are open ended in that an item or items following any one of these words is not meant to be an exhaustive listing of such item or items or meant to be limited to only the listed item or items. It should also be noted that as used in the present disclosure and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

As used herein, the phrase "for example," "such as," "for instance," and variants thereof describe non-limiting embodiments of the presently disclosed subject matter. Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

The drawings in this document may not be to any scale. Different figures may use different scales and different scales can be used even within the same drawing, for example different scales for different views of the same object or different scales for the two adjacent objects.

Figure 1:
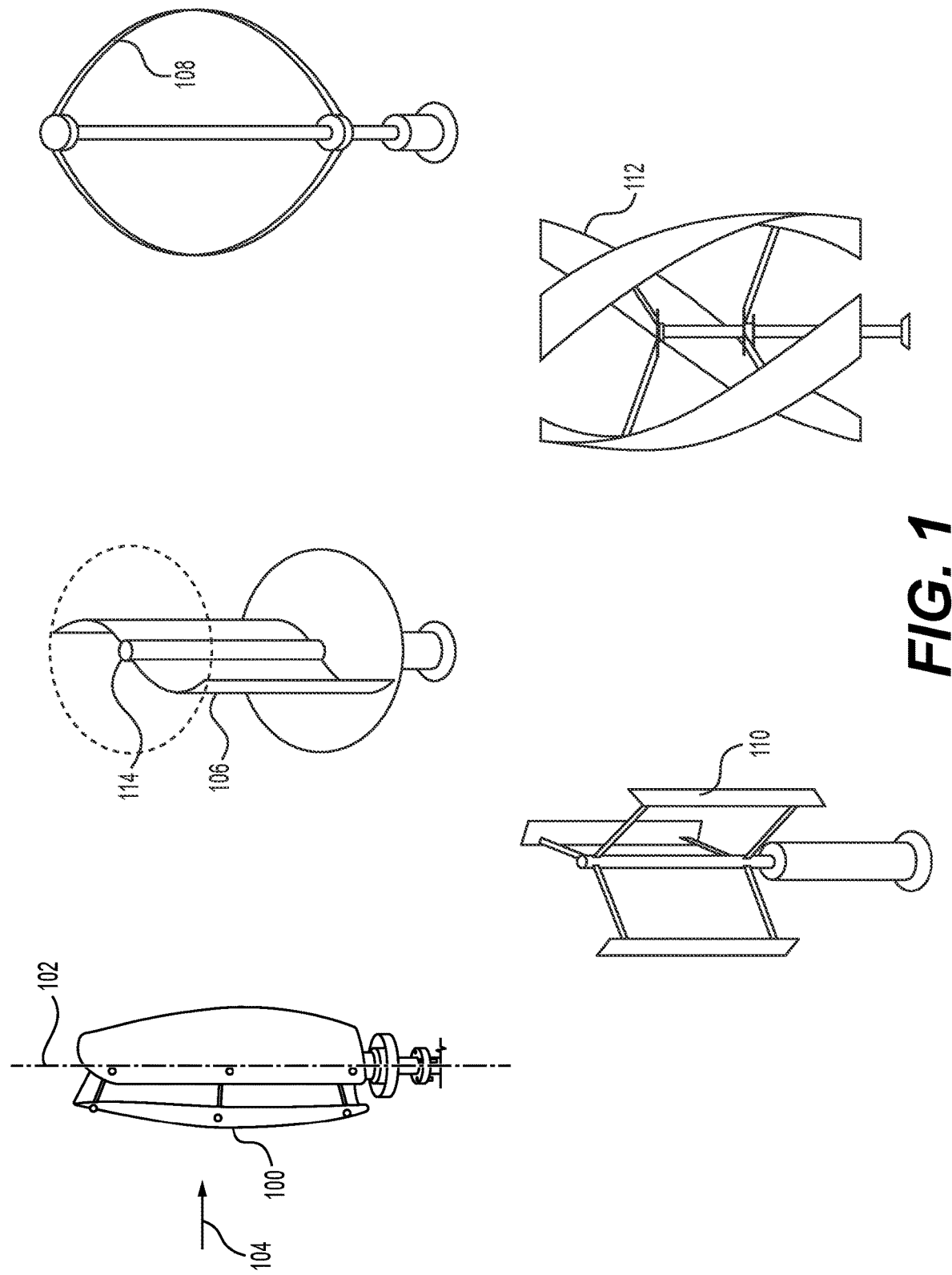
FIG. 1 illustrates exemplary fluid turbines, consistent with disclosed embodiments.

FIG. 1 illustrates a variety of exemplary small wind turbines 100 to 112. Wind turbine 100 may be an exemplary vertical wind turbine, having an axis of rotation 102 positioned generally perpendicular to the direction 104 of air flow. Wind turbine 106 may be an exemplary Savonius (e.g., vertical) wind turbine with shaft 114, wind turbine 108 may be an exemplary Darrieus-rotor (e.g., vertical) wind turbine, wind turbine 110 may be an exemplary H-type lift vertical wind turbine, and wind turbine 112 may be an exemplary lift (e.g., vertical) wind turbine. It is to be noted that exemplary fluid turbines 100 to 112 are shown for illustrative purposes and are not intended to limit the disclosure to any particular type or implementation of a fluid turbine because inventive principles described herein may be applied to any turbine, regardless of structure or arrangement. Moreover, while some non-limiting examples may refer to any one of fluid turbines 100-112, these examples are provided for conceptual purposes only and do not limit the disclosure to any particular implementation or type of fluid turbine.

Figure 2:
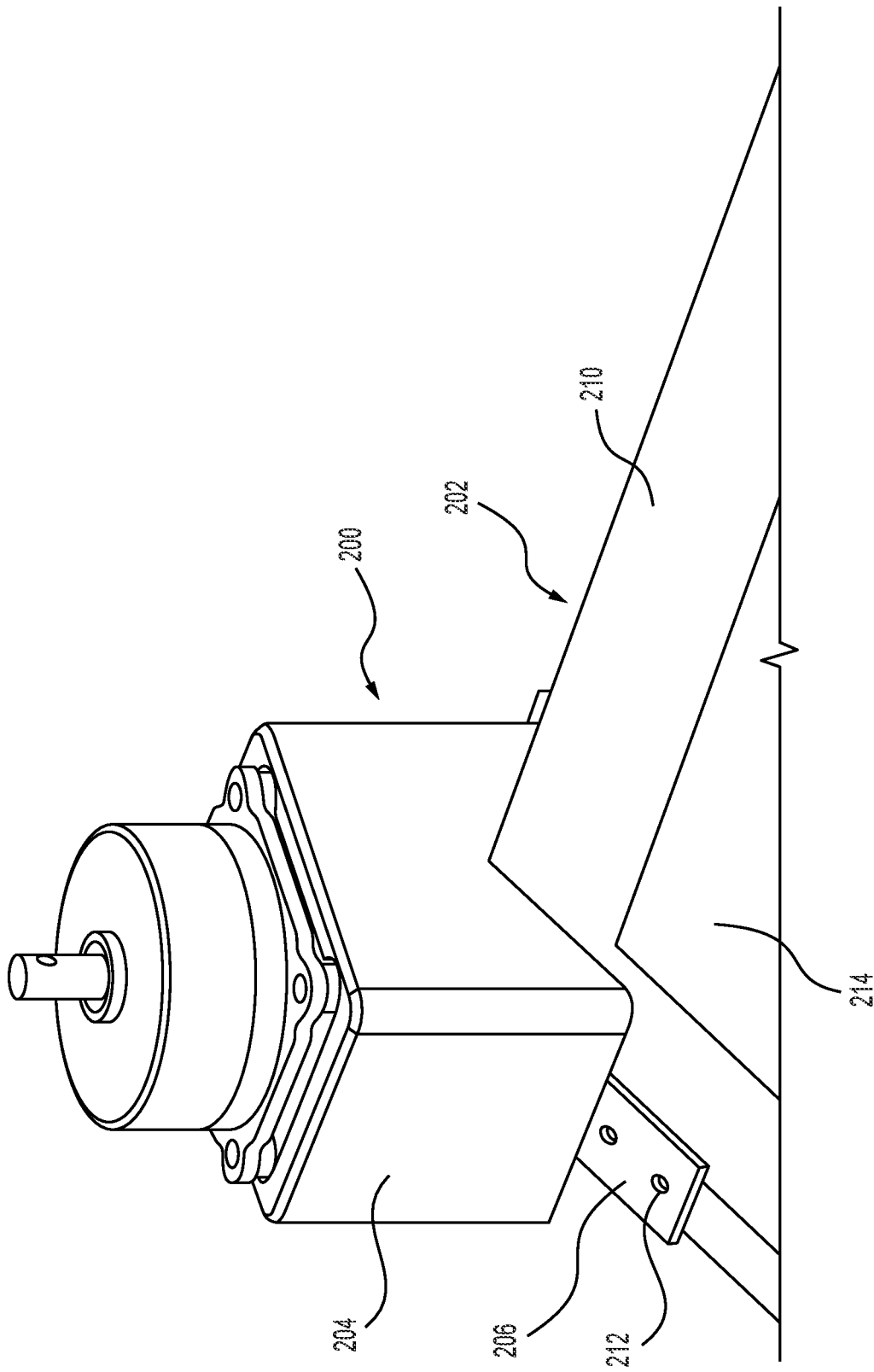
FIG. 2 illustrates an exemplary system in which a wind turbine is attached to a roof of a building using fasteners, consistent with disclosed embodiments.

FIG. 2 illustrates an embodiment in which a base 200 of a wind turbine (not shown) may be attached to roof 202 of a building. As illustrated in FIG. 2, base 200 may include a cover 204 and bracket 206. Bracket 206 may be attached to base 200 and/or cover 204 via fasteners or by welding, brazing, or any connection method. For example, bracket 206 may be attached to beam 210 of roof 202 via fasteners 212. It is to be noted that fasteners 212 may be inserted into beam 210 via holes. As discussed above, such an attachment method may lead to two problems. First, it may be difficult to remove the fasteners to allow for removal of the wind turbine from roof 202, for example, when necessary for repairing or replacing roof 202. Additionally, the presence of holes in beam 210 may allow for leakage of water (e.g., rain water) into an attic 214 of the building. Therefore, attaching wind turbines to roof 202 via fasteners may be undesirable.

Figure 3:
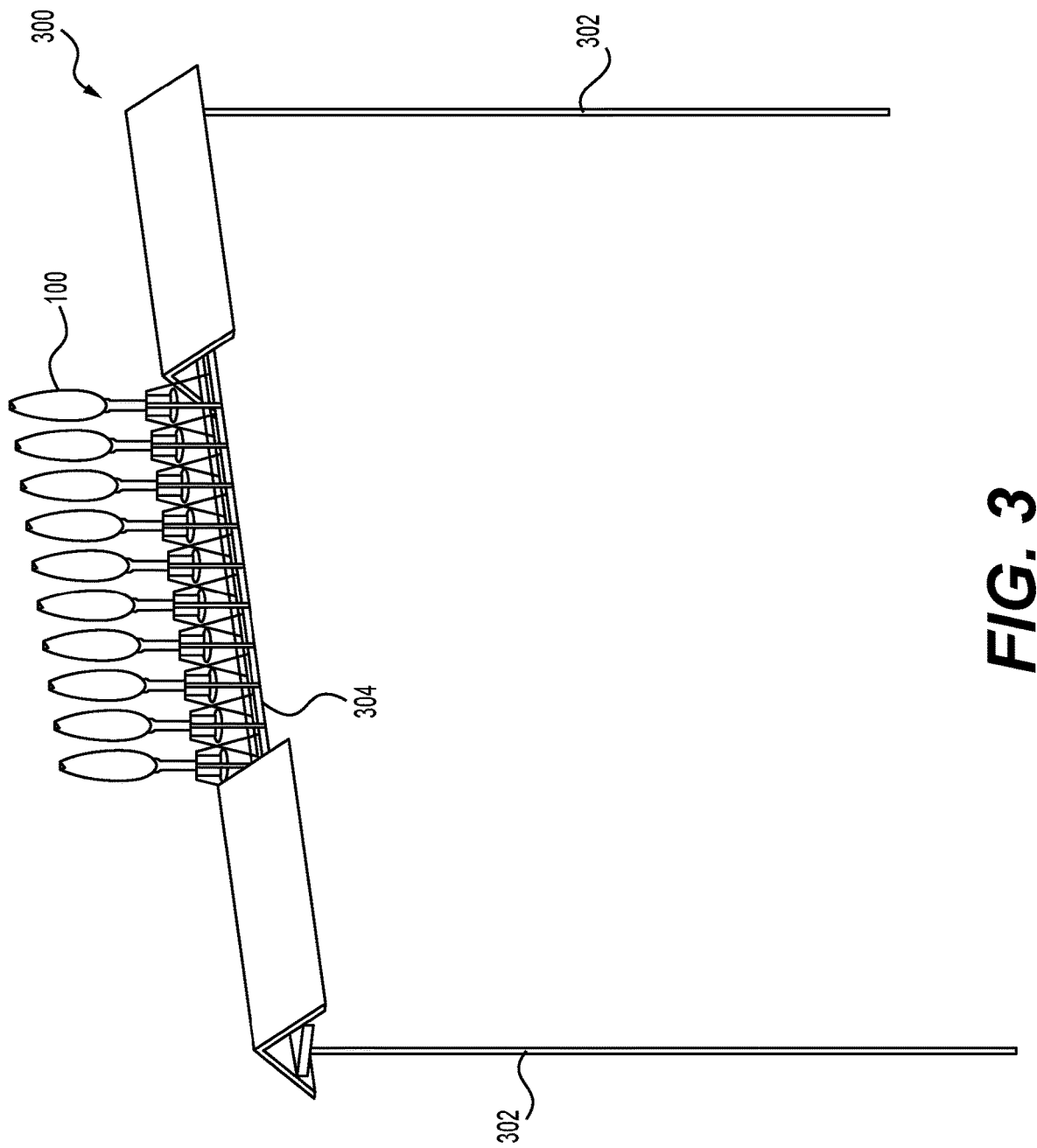
FIG. 3 illustrates an exemplary system for positioning a wind turbine above a roof of a building using structures positioned adjacent to the building, consistent with disclosed embodiments.

Some disclosed embodiments propose solutions that do not involve drilling into the roof. This may eliminate the leakage problem and may make it less expensive to remove the roof temporarily and/or to replace the roof when necessary. In some disclosed embodiments, the wind turbines may be attached to a structure adjacent to the roof and or building, such that the wind turbines may appear as though they are attached to the roof but may be actually attached to a different structure. Doing so may require setting up beams or poles and a tower to hold the turbines just above roof level. Such methods may be suitable when the roofs have no obstacles (e.g., chimney) on their ridges and/or when the roofs are straight. By way of example, FIG. 3 illustrates support system 300 that may include poles 302 disposed on either side of a building and shelf 304 that may extend between 302. Poles 302 may have a circular or rectangular cross-section, or may have a cross-section of any other shape. Poles 302 may be hollow or solid. Opposite ends of shelf 304 may be connected to poles 302. Poles 302 may have a height sufficient to position shelf 304 at a height slightly above a maximum height of the roof. One or more wind turbines 100 may be attached to shelf 304.

Figure 4:
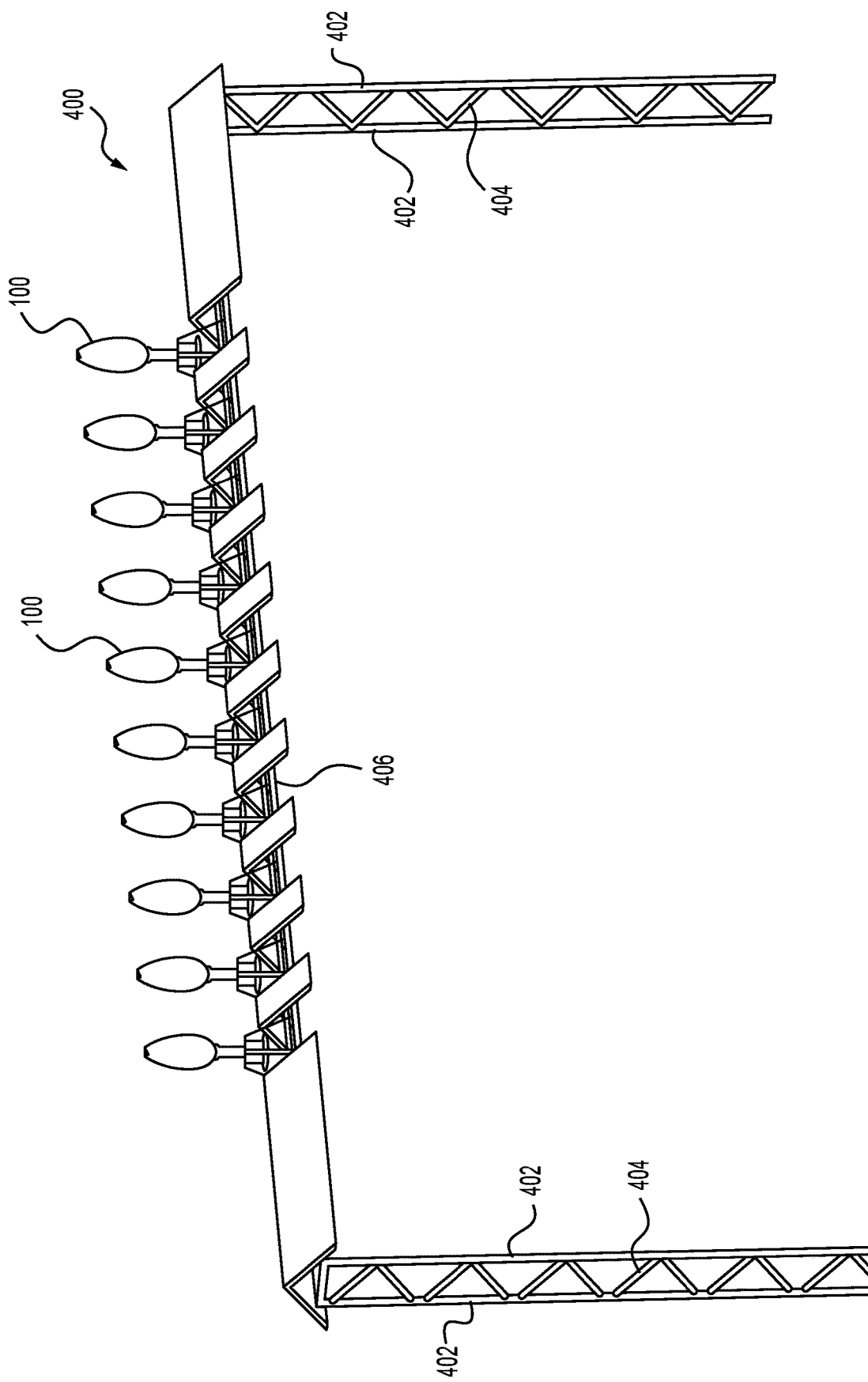
FIG. 4 illustrates another exemplary system for positioning a wind turbine above a roof of a building using structures positioned adjacent to the building, consistent with disclosed embodiments.

By way of another example, FIG. 4 illustrates support system 400 for positioning one or more wind turbines 100 above a roof of a building. Support system 400 may include at least a pair of poles 402 disposed on either side of a building. One or more cross members 404 may extend between and may be connected to adjacent pairs of poles 402 to form a truss-like structure. Shelf 406 that may extend between 402. Like poles 302, poles 402 and/or cross members 404 may have a circular or rectangular cross-section, or may have a cross-section of any other shape. Poles 402 and/or cross members 404 may have a height sufficient to position shelf 406 at a height slightly above a maximum height of the roof. One or more wind turbines 100 may be attached to shelf 406.

Figure 5:
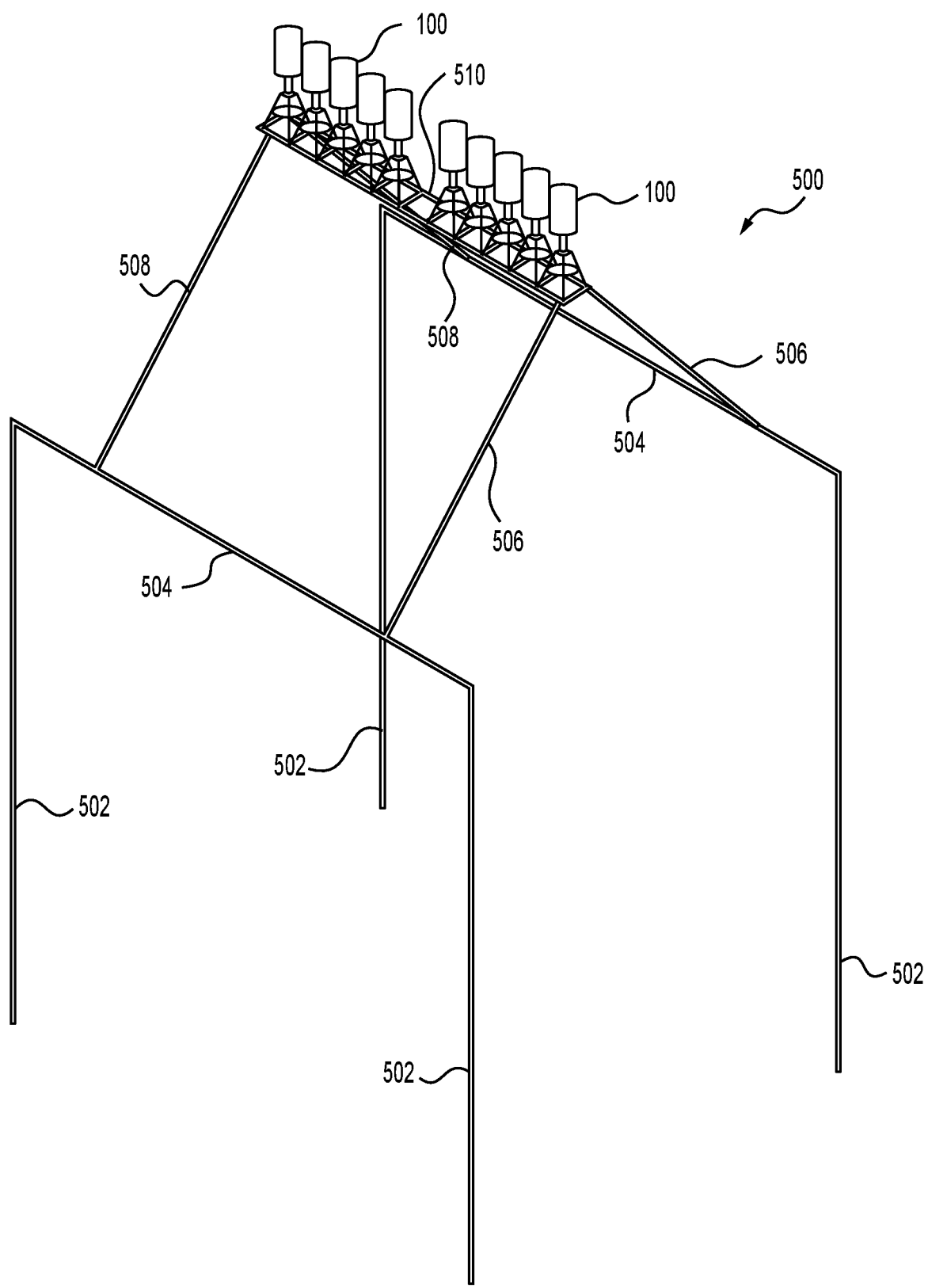
FIG. 5 illustrates another exemplary system for positioning a wind turbine above a roof of a building using structures positioned adjacent to the building, consistent with disclosed embodiments.

As another example, FIG. 5 illustrates support system 500 for positioning one or more wind turbines 100 above a roof of a building. Support system 500 may include at least a pair of poles 502 disposed on either side of a building. One or more cross members 504 may extend between and may be connected to adjacent pairs of poles 502. Cross member 504 may be positioned adjacent the bottom of the roof of the building. Angled members 506 and 508 may be connected to cross members 504. Angled members 506 and 508 may be positioned parallel to each side of an angled roof. Shelf 510 may extend between angled members 506 and 508. Like poles 302, poles 502, cross members 504, and angled members 506 and 508 may have a circular or rectangular cross-section, or may have a cross-section of any other shape, and may be hollow or solid. Poles 502 and angled members 506 and 508 may be arranged such that shelf 510 may be positioned at a height slightly above a maximum height of the roof. One or more wind turbines 100 may be attached to shelf 510.

Figure 6:
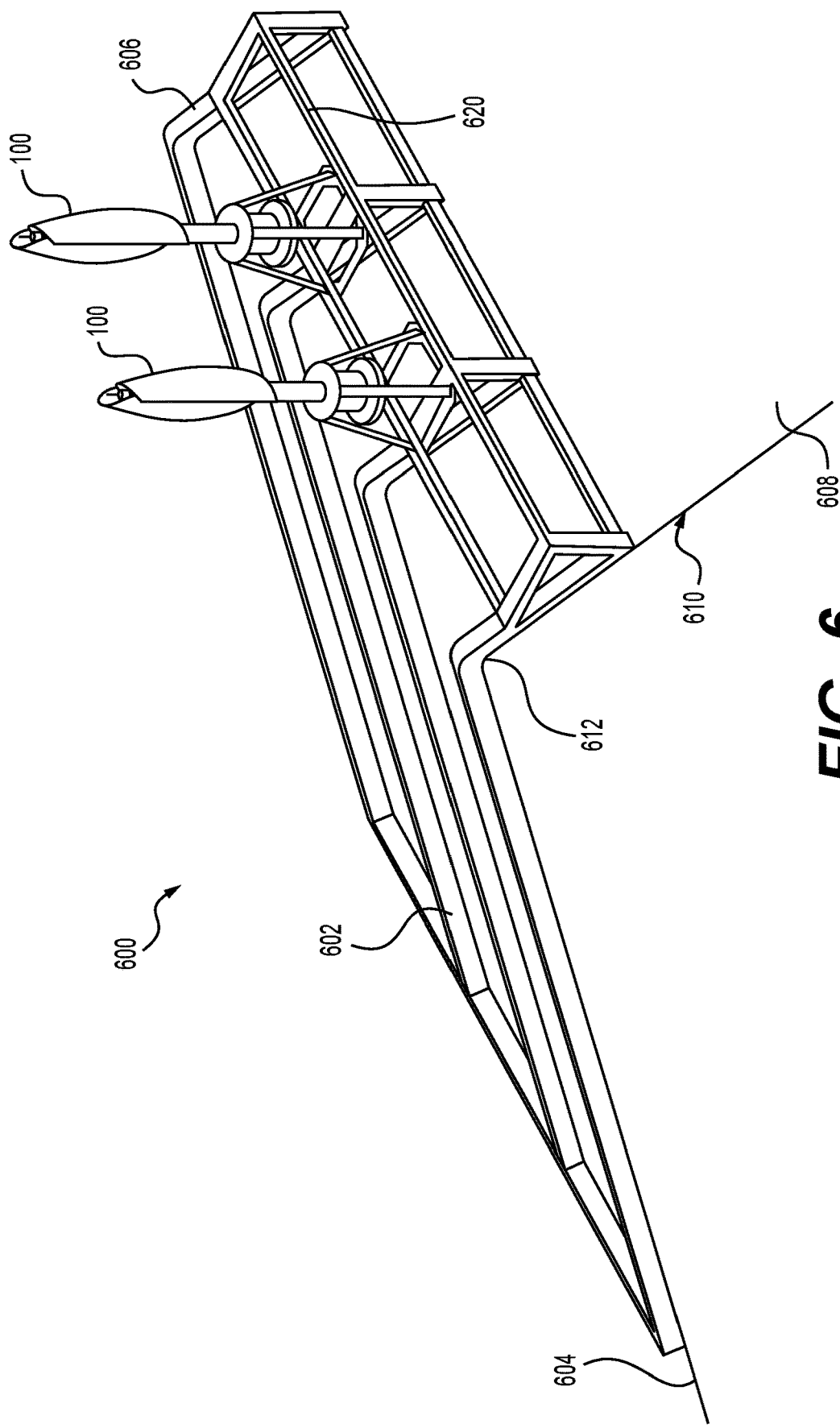
FIG. 6 illustrates an exemplary system for positioning a wind turbine above a roof of a building using weighted ballasts, consistent with disclosed embodiments.

As illustrated in FIGS. 3-5, support systems 300, 400, and 500 may be positioned adjacent a building to position one or more wind turbines 100 above a roof of a building. Such support systems, however, may be undesirable due to aesthetic reasons. As will be described below, alternatively, one or more wind turbines may be positioned above the roof of a building using a structure positioned on the roof of a building. For example, FIG. 6 illustrates a support system 600, including elongated portion 602 disposed on one angled surface 604 of roof 610. Support system 600 may be positioned on roof 610 via one or more weighted ballasts as will be discussed elsewhere in this disclosure. Support system 600 may also include shorter portion 606 disposed on an opposite angled surface 608 of roof 610. As further illustrated in FIG. 6, support system 600 may include shelf 620 that may be disposed on shorter portion 606 such that shelf 620 is disposed on one side of peak 612 of roof 610. One or more wind turbines 100 may be attached to shelf 620. It will be understood that wind turbines 100 may be better exposed to the wind from all directions if turbines 100 were to be located above peak 612 of roof 610 instead of on one side as illustrated in FIG. 6.

Some embodiments involve a support system for securing a wind turbine above an angled roof having a first angled surface, an opposite second angled surface, and a peak between the first angled surface and the second angled surface. A wind turbine may be a device configured to harness energy from wind (e.g., a flow of air) and convert that energy into electrical energy. A wind turbine may include one or more blades that may be configured to rotate when exposed to a flow of air across the blades. The blades may be curved and may have, for example, an airfoil or other shape, that may cause the blades to move as air flows across the blades. The blades may be connected to a shaft (e.g., a pole, a rod, a post, a support, a pylon, or any other axle) that may rotate due to the movement of the blades. One or more electrical generators may be connected to the shaft such that rotation of the shaft may cause at least a portion of the electrical generator to rotate relative to a non-rotating portion, causing generation of electricity. In some embodiments, the wind turbine may be a vertical wind turbine that may have a vertical axis of rotation (e.g., the axis around which the fluid turbine rotates is at a right angle to the ground or flow). By way of a non-limiting example, FIG. 1 illustrates wind turbine 100 having blades that may rotate about a shaft having a vertical axis of rotation 102. The shaft may be connected to a generator 124. A flow of wind past the blades of turbine 100 may cause the blades to rotate, which in turn may cause the shaft to rotate, causing generation of electricity via the generator.

A roof may refer to an upper exterior surface or covering on top of a building and may include some and/all materials and/or structures to support the roof on the walls of the building to provide protection against environmental factors such as rain, snow, sunlight, and/or extremes of temperature and air flow or wind. In some embodiments, a roof may have one or more surfaces disposed at an angle to each other. For example, the roof may have a first surface that may be disposed at an angle (e.g., greater than 0° and less than 90°) relative to the ground or to a gravitational direction (that may be perpendicular to the ground). The roof may also have a second surface disposed at an angle relative to the ground or to the gravitational direction. The first and second angled surfaces may be connected to each other at an apex or peak, thereby forming an upper portion of a triangle. Such a roof may be referred to as an angled roof.

A support system for securing a wind turbine above an angled roof may refer to an arrangement, a device, an assembly, or a structure that may allow for positioning of one or more wind turbines above the roof of a building. Securing may include attaching, connecting, or joining. In some embodiments, the support system may allow for attaching, connecting, or joining the one or more wind turbines directly to the roof. In some embodiments, the support system may allow for attaching, connecting, or joining of the one or more wind turbines to the support system such that the wind turbines are positioned adjacent to but not touching and/or connected to the roof. For example, the support system may itself be attached to the roof and may allow for attachment of the one or more wind turbines to the support system such that the one or more wind turbines may be spaced apart from one or more portions of the roof.

Figure 7:
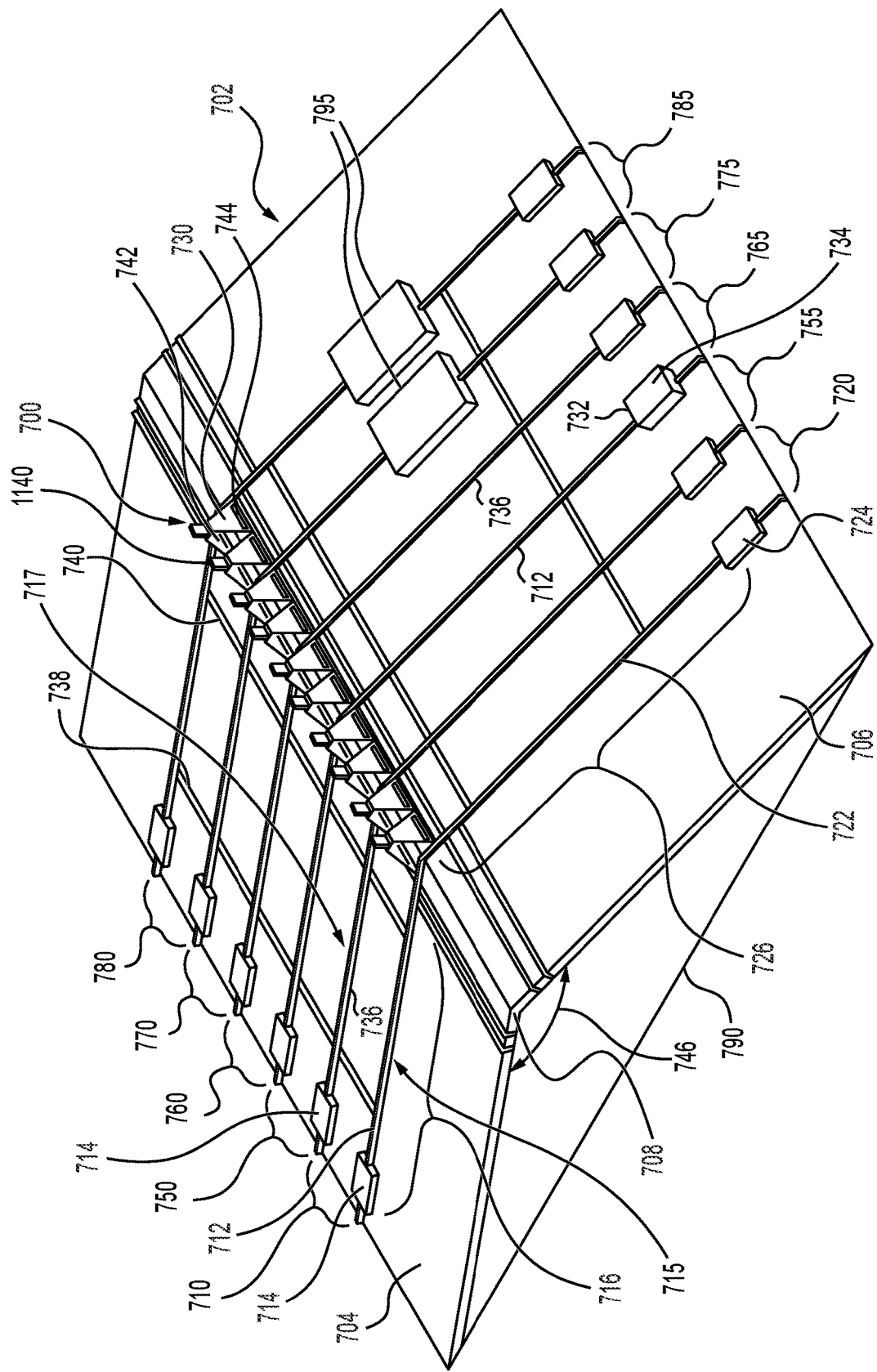
FIG. 7 illustrates an exemplary support system for positioning a wind turbine above a roof of a building using weighted ballasts, consistent with disclosed embodiments.

By way of a non-limiting example, FIG. 7 illustrates support system 700 configured for securing wind turbine 100 to a roof 702. As also illustrated in FIG. 7, roof 702 may include first angled surface 604 disposed at an angle relative to both the ground surface and the gravitational direction (shown by arrow G). In FIG. 7, first angled surface 704 is illustrated as being inclined relative to a bottom edge 790 of roof 702, which may be parallel to the ground surface. Roof 702 may also include second angled surface 706 that may also be disposed at an angle relative to both the ground surface (e.g., and to bottom edge 790 of roof 702) and the gravitational direction. Second angled surface 706 may be disposed opposite first angled surface 704. First angled surface 704 and second angled surface 706 of roof 702 may be connected to each other at peak 708 that may be positioned between first angled surface 704 and second angled surface 706. As will be described elsewhere in this disclosure, support system 700 may be configured to position one or more wind turbines 100 at a height relative to the ground surface that may be greater than a height of peak 708 of roof 702 relative to the ground surface, thereby positioning wind turbines 100 above angled roof 702.

Some embodiments involve a first weighted ballast configured for location along a portion of the first angled surface. A ballast may refer to material, an element, a device, or a structure that provides stability to another structure or that provides weight to situate another structure in a particular position. A weighted ballast may refer to a ballast that includes materials or components that contribute a certain amount of weight to a total weight of the ballast. The weight of the ballast may act on a surface of the roof and a frictional force generated as a result of that weight my help prevent relative movement between the weighted ballast and the surface of the roof. Thus, the weight of the weighted ballast may help to position the weighted ballast and in turn any other structures (e.g., wind turbines) attached to the weighted ballast in a particular position or orientation relative to the roof. The weight and the accompanying frictional force may prevent movement of the weighted ballast relative to the roof even when the weighted ballast is subjected to horizontal forces due to wind. In some embodiments, the support system for a wind turbine may include a first weighted ballast (e.g., device or structure) that may help position the wind turbine on the roof of a building by providing sufficient weight to help position or locate the wind turbines in a particular position or orientation above the roof. In some embodiments, at least a portion of the device or structure (e.g., weighted ballast) used to position the wind turbines above the roof may be located in contact with a portion of the first angled surface of the roof. A portion may refer to a part, a segment, and/or a fragment, e.g., of a whole. Thus, for example, the weighted ballast may be in contact with a part or segment of the first angled surface of roof and not necessarily with the entire first angled surface.

By way of a nonlimiting example, FIG. 7 illustrates support system 700 including first weighted ballast 710. As illustrated in FIG. 7, first weighted ballast 710 may include an elongated member or beam 712 positioned along first angled surface 704 and a weight 714 attached to beam 712. Beam 712 and/or weight 714 may rest on or be located on a portion 716 of first angled surface 704. Weights of beam 712 and weight 714 may generate sufficient frictional force between first weighted ballast 710 and first angled surface 704 of roof 702 such that first weighted ballast 710 may not move relative to first angled surface 704 even when subjected to wind (e.g., a flow of air).

Some embodiments involve a second weighted ballast configured for location along a portion of the second angled surface. The second weighted ballast may be similar to the first weighted ballast, except that the second weighted ballast may be located on the second angled surface. By way of a nonlimiting example, as illustrated in FIG. 7, second weighted ballast 720 may include a beam 722 positioned along second angled surface 706 and weight 724 attached to beam 722. Beam 722 and/or weight 724 may rest on or be located on a portion 726 of second angled surface 706. Weights of beam 722 and weight 724 may generate sufficient frictional force between second weighted ballast 720 and second angled surface 706 of roof 702 such that second weighted ballast 720 may not move relative to second angled surface 706 even when subjected to wind (e.g., a flow of air). Although angled surfaces have been discussed above, it is contemplated that the first and second weighted ballasts discussed in this disclosure may also be attachable to a flat roof.

In some embodiments, the first weighted ballast and the second weighted ballast are configured to maintain the at least one wind turbine above the peak during wind conditions and in an absence of fasteners securing at least one of the first weighted ballast to the first angled surface or the second weighted ballast to the second angled surface. Wind may refer to a flow of air caused by uneven heating of the earth by the sun. a wind may range from a light breeze (e.g., at a relatively low speed of air flow, 4-7 miles per hour (mph)) to a flow of air at very high speeds (e.g., 20-100 mph or more). Wind conditions may refer to a flow of air (e.g., wind) at a speed sufficient to cause movement of the one or more blades associated with a wind turbine. Maintaining a wind turbine above the peak may refer to positioning the wind turbine such that the wind turbine is located at a height relative to a ground surface greater than a height of the peak of a roof relative to the ground surface. For example, a building may have one or more sidewalls projecting vertically upwards (e.g., in a direction opposite to the direction of gravity), and a roof positioned above the one or more sidewalls. As discussed above, in some embodiments, the roof may include a first angled surface and a second angled surface that may be connected to each other at an apex point (e.g., peak). As also discussed above, a support system for the wind for a wind turbine may include one or more weighted ballasts (e.g., a first weighted ballast and a second weighted ballast) that may help to position the wind turbine above the roof and adjacent to the peak. The one or more weighted ballasts may be located on the first and second angled portions of the roof such that a wind turbine attached to the support system may be positioned at a height greater than a height of the peak above the ground surface.

Securing in an absence of fasteners may refer to attaching a structure to another structure (e.g., the roof of a dwelling or building) without using fastening devices. Such fastening devices may include, for example, pins, clasps, brackets, screws, bolts, nuts, rivets, or any other type of device for attaching two structures. Securing at least one of the first weighted ballast to the first angled surface in an absence of fasteners may refer to positioning the first weighted ballast on the first angled surface of the roof of a dwelling without the use of any fastening devices discussed above. The first weighted ballast may provide sufficient weight so that the ballast may be positioned on the first angled surface of the roof and may not move when the first weighted ballast, the roof, and/or the wind turbine is subjected to wind conditions or when subjected to wind blowing at a predetermined speed. For example, the weight of the first weighted ballast may hold the first weighted ballast in contact with the first angled surface of the roof such that the frictional force between the first weighted ballast and the first angled surface of the roof may be sufficient to prevent any movement of the first weighted ballast when the first weighted ballast, the roof, and/or the wind turbine are subjected to wind conditions or when subjected to wind blowing at a predetermined speed. The second weighted ballast may be secured to the second angled portion of the roof in a manner similar to that discussed above with respect to the first weighted ballast.

That is, some portions of the second weighted ballast may be in contact with the second angled surface of the roof such that the frictional forces between the second weighted ballast and the second angled surface of the roof may be sufficient to prevent any movement of the second weighted ballast relative to the second angled surface of the roof when subjected to wind conditions or when subjected to wind blowing at a predetermined speed.

By way of a nonlimiting example, FIG. 7 illustrates support system 700 including first weighted ballast 710 and second weighted ballast 720. As illustrated in FIG. 7, first weighted ballast 710 and second weighted ballast 720 may be positioned on first angled surface 704 and second angled surface 706, respectively. No fastening devices may be used to attach first weighted ballast 710 and second weighted ballast 720 on first and second angled surfaces 704 and 706, respectively. First weighted ballast 710 and second weighted ballast 720 may provide or have sufficient weight so that first weighted ballast 710 and second weighted ballast 720 do not move relative to first angled surface 704 and second angles of the 706, respectively, when, first weighted ballast 710, and/or second weighted ballast 720 are subjected to wind conditions. As also illustrated in FIG. 7, support system 700 may include one or more connector 730 that may be configured to allow one or more wind turbines 100 to be attached to support system 700. As further illustrated in FIG. 7, first weighted ballast 710 and second weighted ballast 720 may be positioned on first angled surface 704 and second angled surface 706, respectively, of roof 702 such that connectors 730 and, therefore, one or more wind turbines 100 connected to connectors 730 may be positioned above peak 708. That is, connectors 730 and one or more turbines 100 attached to connectors 730 may be positioned at a height greater than a height of peak 708 relative to a ground surface.

In some embodiments, each weighted ballast includes a portion for receiving at least one rigid weight thereon. A weight may refer to an element, structure, device or object with a mass that, either alone or in combination with other weights, provides a holding force. A rigid weight may refer to such a weight that may be inflexible, stiff, and/or unyielding, and may have a predetermined shape that may not change when subjected to wind conditions and/or by the application of manual force. One or both of the first weighted ballast and/or the second weighted ballast, as described above, may include one or more fixtures that may allow addition of one or more rigid weights onto the first weighted ballast and/or the second weighted ballast. Such fixtures may include, for example, one or more recesses having predetermined shape, one or more clamps, one or more hooks, and/or any other type of fastening mechanism for attachment of one or more rigid weighted objects to the first weighted ballast and/or the second weighted ballast. Adding rigid weights to the first or second weighted ballast may allow for increasing a weight of a respective one of the first weighted ballast or the second weighted ballast.

By way of a non-limiting example, FIG. 7 illustrates support system 700 including first weighted ballast 710 and second weighted ballast 720. As illustrated in FIG. 7, first weighted ballast 710 and second weighted ballast 720 may include one or more receptacles 732 that may be configured to receive one or more rigid weights having a predetermined shape. For example, as illustrated in FIG. 7, receptacles 732 may have a rectangular shape and may therefore be capable of receiving one or more rigid weights having a rectangular shape, square shape, or any other shape capable of being inserted into the one or more receptacles 732. For example, the one or more rigid weights may include one or more rectangular tiles 734 inserted into receptacle 732.

In some embodiments, each weighted ballast includes a portion for receiving at least one flexible weight thereon. A flexible weight may refer to a heavy object, device, and/or structure that may have a shape that may change when subjected to manual force such as pressing or squeezing by hand. By way of example, a flexible weight may include a sandbag or other flexible container with weighted materials such as stones, gravel, beads or pellets made of heavy material, or a flexible container with any other type of particles capable of imparting weight. As discussed above, the first weighted ballast and/or the second weighted ballast may include one or more receptacles capable of receiving one or more flexible weights. In some embodiments, the one or more flexible weights may be placed on the one or more receptacles. By way of a non-limiting example, as illustrated in FIG. 7, receptacles 732 may receive one or more flexible weights as discussed above.

In some embodiments, at least one of the first and the second weighted ballasts is configured to support solar panels thereon, and wherein weights of the solar panels contribute to a weight of the at least one of the first and the second weighted ballasts. A solar panel may refer to an electronic device that may include an assembly of photovoltaic solar cells configured to receive solar energy (e.g., sunlight) and convert the received solar energy into electricity. In some embodiments, a solar panel may have a generally rectangular or square shape and may include an outer frame. The photovoltaic solar cells may be disposed on a substrate which may be attached to the frame. One or more of the frame and/or the substrate may include one or more fastening mechanisms (e.g., clamps, brackets, bots, nuts, screws) that may allow the solar panel to be attached to other structures (e.g., the roof of a building or support system on the roof of the building). The frame of the solar panel may be made of metal, wood, plastic, composite, or any other rigid material. Similarly, although rectangular and square shapes have been discussed above, it is contemplated that the frame of the solar panel may have any other shape.

Supporting a solar panel on a structure may include providing for one or more fastening means such as brackets, clamps, hooks, and/or any other type of attachment means that may allow attachment of the solar panel to the supporting structure. Supporting a solar panel on a structure may also include ensuring that the supporting structure is capable of withstanding the weight of the solar panel without being damaged. In some embodiments, the first weighted ballast and/or the second weighted ballast may include one or more fastening mechanisms described above to help connect one or more solar panels to the first weighted ballast and/or the second weighted ballast. Furthermore, the fastening mechanisms on the first weighted ballast and/or the second weighted ballast may be arranged such that when the one or more solar panels is attached to the first weighted ballast and/or the second weighted ballast the weight of the one or more solar panels adds to an overall weight of a respective one of the first weighted ballast and/or the second weighted ballast.

By way of a nonlimiting example, FIG. 7 illustrates support system 700 including first weighted ballasts 710, 750, 760, 770, and 780 and second weighted ballasts 715, 755, 765, 775, and 785. As also illustrated in FIG. 7, one or more solar panels 795 may be supported on (e.g., attached to) second weighted ballasts 775 and 785. It is contemplated that solar panels 785 may be attached to any of ballasts 710, 750, 760, 770, 780, 715, 755, 765, 775, and/or 785. Furthermore, weights of solar panels 795 may contribute to a weight of one or more of ballasts 710, 750, 760, 770, 780, 715, 755, 765, 775, and/or 785 to which solar panels 795 are attached.

In some embodiments, the first weighted ballast and the second weighted ballast each include at least two side bars for extending in an angled direction and at least two cross bars for extending transverse to the angled direction. A bar may refer to a generally elongated rigid piece of solid material used as a support, or structural or mechanical member. The bar may have a circular, square, rectangular, polygonal, or any other type of cross-section. In some embodiments, the bar may have an I-shaped or C-shaped cross-section. Although the bar may be made of metal, it is contemplated that the bar may be made of other materials such as wood, plastic, composite, or any other material that can provide structural support. In some embodiments, the first weighted ballast may include a truss-like structure in the form of a framework of bars. For example, the first weighted ballast may include two relatively long bars that may be connected to each other via one or more bars oriented transversely to the two bars. In some embodiments, the first weighted ballast may include a first sidebar that when installed on a roof may be positioned at an angle or inclination relative to the ground surface or relative to the gravitational direction. The first weighted ballast may include a second sidebar that may be connected at one end to the first sidebar and may be also inclined relative to the ground surface and relative to the direction of gravity. An angle of inclination of the second sidebar relative to the ground surface may be different from an angle of inclination of the first sidebar relative to the ground surface. One or more crossbars may be oriented in a direction transverse to the first and second sidebars. The two ends of the crossbars may be connected to the first sidebar in the second sidebar, respectively. It is contemplated that the second weighted ballast may have a construction similar to that of the first weighted ballast as described above.

By way of a non-limiting example, FIG. 7 illustrates support system 700 including first weighted ballast 710 and second weighted ballast 720. As illustrated in FIG. 7, first weighted ballast 710 may include first sidebar 712 that may be disposed in an angled direction relative to bottom edge 790 of roof 702, and a second sidebar 736 disposed in an angled direction relative to bottom edge 790 of roof 702. As also illustrated in the exemplary embodiment of FIG. 7, first weighted ballast 710 may include crossbars 738 and 740 that may extend in a direction transverse to the angled direction of first side bar 712 and second sidebar 736. Crossbars 738 and 740 may be connected to first sidebar 712 and second sidebar 736. Crossbars 738 and 740 may be connected to first sidebar 712 and/or second sidebar 736 using fasteners (e.g., bolts, nuts, screws, rivets) and/or by welding, brazing, adhesives, or by any other method of attachment.

Some embodiments involve a plurality of additional first weighted ballasts and a plurality of additional second weighted ballasts configured for modular interconnection in order to accommodate roofs of varying sizes. A modular structure may include one or more standardized units or self-contained assemblies that may be combined or interchanged with other similar self-contained sections to create different shapes, designs, or arrangements of the support system. In some embodiments, the first weighted ballast and/or the second weighted ballast may each be constructed as a modular structure. For example, the first weighted ballast may have a design that may allow the first weighted ballast to be supported on a roof of a dwelling without the need for any other accompanying fastening mechanisms or structures. Further, two or more of the self-contained sections of each of the first weighted ballast or the second weighted ballast may be combined with each other to form larger assemblies or structures that may be fully supportable on for example a larger roof.

By way of a nonlimiting example, FIG. 7 illustrates support system 700 including first weighted ballast 710 and second weighted ballast 720. As also illustrated in FIG. 7, support system 700 may include additional first weighted ballasts 750, 760, 770, and 780. Likewise, support system 700 may include additional second weighted ballasts 755, 765, 775, and 785. Each of first weighted ballasts 710, 750, 760, 770, and 780 and each of second weighted ballasts 720, 755, 765, 775, and 785 may include first and second sidebar's 714 and 736. In addition, each of first weighted ballasts 710, 750, 760, 770, and 780 and each of second weighted ballasts 720, 755, 765, 775, and 785 may include crossbars 738 and 740. Thus, for example, first weighted ballasts 710, 750, 760, 770, and 780 may be connectable to each other to create a support system 700 that may be supportable on roofs having different widths. Likewise, second weighted ballasts 720, 755, 765, 775, and 785 may be connectable to each other to create a support system 700 that may be positioned on roofs of different widths. Although FIG. 7 illustrates five first weighted ballasts (e.g., 710, 750, 760, 770, and 780) and five second weighted ballasts (e.g., 720, 755, 765, 775, and 785), it is contemplated that support system 700 may include any number (less than, equal to, or more than five) of first weighted ballasts and second weighted ballasts as required to ensure that support system 700 may be supportable on less wide or more wide roofs 702

In some embodiments, the first weighted ballast includes a plurality of weighted sections joined at an upper portion thereof by a common crossbar. In some embodiments, the common crossbar is configured to extend between two weighted sections. As discussed above, in some embodiments, one or both of the first weighted ballast and/or the second weighted ballast may be modular and may include one or more self-contained assemblies. In some embodiments, each of the self-contained assemblies may include a plurality of weighted sections that may be connected to each other. For example, each of the weighted sections may include a first sidebar and the second sidebar, each of which may be attached to a weight. Thus, first sidebar with its associated weight may be a weighted section of the first weighted ballast, and second sidebar with its associated weight may be a weighted section of the first weighted ballast. The crossbar connecting the first and second sidebars may thus connect the first and the second weighted sections of each first weighted ballast. The transverse crossbar may be located anywhere along a length of the first and/or the second sidebar. For example, in some embodiments the transverse crossbar may be located at a portion of the weighted section located at a relatively greater height as compared to other portions of the claim.

By way of a nonlimiting example, FIG. 7 illustrates support system 700 including first weighted ballast 710. As illustrated in FIG. 7, first weighted ballast 710 may include first section 715 and second section 717. First section 715 may include first sidebar 712 and weight 714. Second section 717 may include second sidebar 736 and weight 714. As also illustrated in FIG. 7, first weighted ballast 710 may include crossbars 738 and 740 that may connect first section 715 and second section 717. As also illustrated in FIG. 7 crossbar 740 may be located at an upper portion of first weighted section 715 and second weighted section 717. That is, crossbar 740 may be located nearer to peak 708 of roof 702 as compared to crossbar 738.

In some embodiments, each of the plurality of weighted sections is configured to support a separate solar panel portion thereon. As discussed above, the first weighted ballast and/or the second weighted ballast may be configured to support one or more solar panels. As also discussed above, in some embodiments, the first weighted ballast may include a plurality of weighted sections. It is contemplated that each of the weighted sections of the first weighted ballast may be configured to support one or more solar panels. In some embodiments, each weighted section of the first weighted ballast may be configured to support a separate solar panel. It is contemplated, however, that in some embodiments, a single solar panel may be supported by more than one weighted section of the first weighted ballast. Although the above discussion is based on the first weighted ballast, it is contemplated that one or more weighted sections of the second weighted ballast may also be configured to support separate solar panels on each of the weighted sections and/or to support solar panels that may be disposed over more than one weighted section. By way of a non-limiting example, FIG. 7 illustrates first section 715 and second section 717 of second weighted ballast 775, each supporting a separate and distinct solar panel 795. In some embodiments, each solar panel 795 may be supported by more than one weighted section (e.g., 715, 717).

In some embodiments, each of the first weighted ballast and the second weighted ballast incudes a right lower sidebar for extending in an angled direction, a right upper sidebar for extending in an angled direction, a left lower sidebar for extending in an angled direction, a left upper sidebar for extending in an angled direction, and a plurality of crossbars extending transverse to the angled direction and connecting on one end thereof the right lower sidebar to the right upper sidebar and on another end thereof the left lower sidebar to the left upper sidebar. As discussed above, the first weighted ballast and/or the second weighted ballast may include a truss-like structure in the form of a framework of bars. In one exemplary embodiment, the truss-like structure may include, for example, two frames spaced apart from each other and connected to each other using crossbars. Each of the frames may include a lower sidebar and upper sidebar and the crossbars may be connected between the upper sidebar of the two frames and between the lower sidebar frames. The lower sidebar may be positioned closer to the first and/or second angled surface of the roof relative to the upper sidebar. Such an arrangement may advantageously provide the ability for an upper portion of the first weighted ballast and/or the second weighted ballast to move relative to the lower portion of the first weighted ballast and other second weighted ballast.

Figure 8:
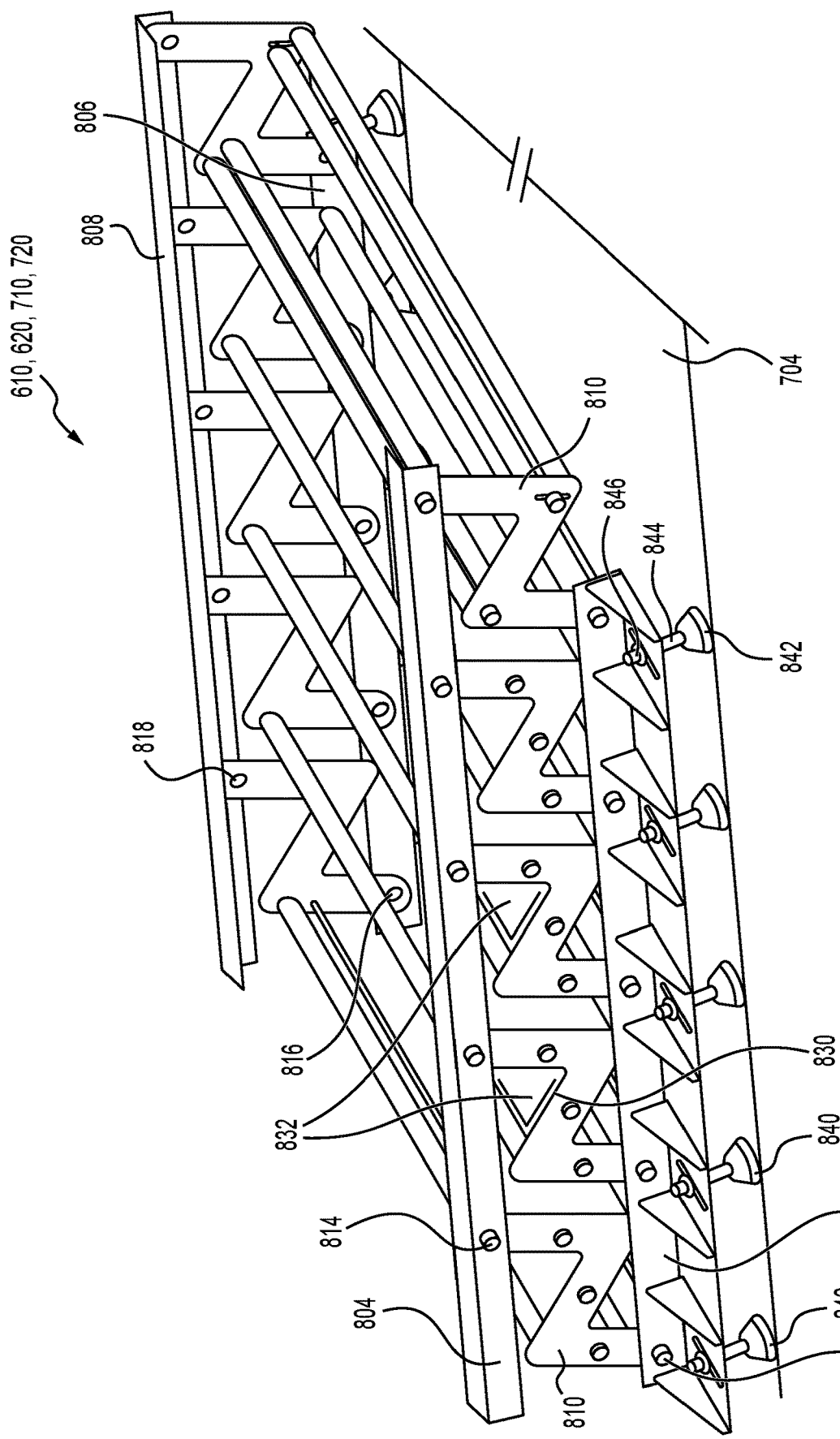
FIG. 8 illustrates an exemplary weighted ballast, consistent with disclosed embodiments.

As illustrated in FIG. 8, weighted ballast (e.g., 610, 620, 710, 720, etc.) may include left lower sidebar 806 and left upper side bar 808. Each of left lower sidebar 806 and left upper sidebar 808 may be positioned at an angle relative to the ground surface so as to conform to an angle of inclination of the first angled surface or second angled surface of the roof. Right lower sidebar 802 and right upper sidebar 804 may be disposed generally parallel to left lower sidebar 806 and left upper sidebar 808, respectively. Weighted ballast (e.g., 610, 620, 710, 720, etc.) may include crossbars 810 that we have a zigzag shape. In one exemplary embodiment as illustrated in FIG. 8, crossbar 810 may be connected on one end with right lower sidebar 802 at connection 812 and with right upper crossbar 804 at connection 814. Crossbar 810 may also be connected at an opposite end with left lower sidebar 806 at connection 816 and with left upper sidebar 808 at connection 818. Thus, the arrangement described above may allow right upper sidebar 804 and left upper sidebar 808 to move in the direction perpendicular to crossbars 810 relative to right lower sidebar 802 and left lower sidebar 806.

Some embodiments involve a plurality of adjustable legs associated with each of the sidebars, for supporting the first weighted ballast and the second weighted ballast at a spaced distance from the first angled surface and the second angled surface. In some embodiments, a plurality of adjustable legs are connected to the right lower sidebar and the left lower sidebar for maintaining the right lower sidebar and the left lower sidebar a spaced distance from an associated one of the first angled surface and the second angled surface. A leg may include a device, assembly, and/or structure that may be used to position another structure relative to a surface (e.g., ground surface, roof surface, or mounting surface). For example, a leg associated with a sidebar of a weighted ballast as described above may include a device, assembly, and/or structure that may allow the first weighted ballast to be positioned at a predetermined distance from a surface of the roof of a dwelling. In some embodiments, the leg may be adjustable. For example, the length of the leg may be changeable or modifiable such that the distance between the bottom surface of the weighted ballast and a surface of a roof of the dwelling may be altered. In some embodiments, the leg may include one or more mechanisms such as a slider, a rack and pinion arrangement, a mechanical or electric actuator, a chain and pulley arrangement, and/or any type of arrangement that may allow a pair of movable portions of the leg to be moved relative to each other to change the height of the leg. It is contemplated that some or all of the first weighted ballasts and the second weighted ballasts may include adjustable leg features similar to those described above.

By way of a nonlimiting example, FIG. 8 illustrates first or second weighted ballasts (e.g., 610, 620, 710, 720, etc.) including right lower sidebar 802, right upper sidebar 804, left lower sidebar 806, and left upper sidebar 808, connected to each other via one or more crossbars 810. As also illustrated in FIG. 8, one or more adjustable legs 840 may be attached to right lower sidebar 802. In the exemplary embodiment illustrated in FIG. 8, adjustable leg 840 may include base 842, threaded spindle 844 connected to base 842, and nut 846. Rotation of base 842 may cause threaded spindle 844 to be threaded into or out of nut 846 thereby adjusting the length of threaded spindle 844 disposed between right lower sidebar 802 and base 842 (which may rest on a surface of a roof). Thus, adjustable leg 840 may allow for adjusting or modifying the distance between the right lower sidebar 802 and first angled surface 704. Left lower sidebar 806 may be equipped with similar adjustable legs 840 that may allow for adjusting or modifying the distance between left lower sidebar 806 and first angled surface 704.

In some embodiments, at least some of the crossbars include an integrated support for weighting tiles. As discussed above, in some embodiments, the first weighted ballast and/or the second weighted ballast may include a truss-like structure in the form of a framework of bars that may include one or more crossbars connecting two spaced apart frames. It is contemplated that at least some of these crossbars may include one or more receptacles and/or one or more fastening mechanisms (e.g., brackets, clamps, grooves, hooks, or other attachment mechanisms) that may allow one or more rigid or flexible weights, as discussed above, to be attached to the one or more crossbars. Adding the one or more rigid and or flexible weights to the one or more crossbars may allow for providing additional weight to help position the support system on the roof of a dwelling and/or to prevent movement of the support system when subjected to wind conditions. It should be understood that one or more of the sidebars may also include one or more receptacles or other mechanisms (e.g., fasteners, clamps, hooks) that may allow for attachment of one or more rigid and/or flexible weights to the one or more sidebars in addition to or as an alternative to attaching the rigid and/or flexible weights to the one or more crossbars.

By way of a nonlimiting example, FIG. 8 illustrates an exemplary truss-like support system for first or second weighted ballasts (e.g., 610, 620, 710, 720, etc.). As also illustrated in FIG. 8, crossbars 810 may include receptacle 830 that may be configured to receive and hold one or more rigid and/or flexible weights as described above. For example, in some embodiments, one or more rigid weighted tiles 832 may be located on one or more of the crossbars 810 to provide additional weight to first or second weighted ballasts (e.g., 610, 620, 710, 720, etc.).

Some embodiments involve at least one connector extending between and connecting a portion of the first weighted ballast and a portion of the second weighted ballast, the at least one connector extending over the peak. A connector may include a device, structure, and/or assembly that may connect one object to another. A connector extending between the first weighted ballast and the second weighted ballast may include a device, structure, and/or an assembly that may have a length or width that traverses the distance between the first weighted ballast and the second weighted ballast. The connector may have any shape. For example, in some embodiments, the connector may have a relatively flat shape. In some embodiments, connector may have a triangular shape, the polygonal shape, semicircular shape, and/or any other shape that may allow the connector to be connected at one end to the first weighted ballast and at an opposite and to the second weighted ballast. It is contemplated that the connector may be connected to the first weighted ballast and/or the second weighted ballast by one or more fastening methods discussed above. The connector may be positioned such that a height of the connector above ground surface may be greater than a height of the peak of a roof relative to the ground surface. Thus, the connector may be positioned such that the connector may extend over the peak of a roof of the building.

By way of a nonlimiting example, FIG. 7 illustrates first weighted ballast 780 and second weighted ballast 785 positioned above first angled surface 704 and second angled surface 706, respectively, of roof 702. Support system 700 may also include one or more connectors 730. As illustrated in FIG. 7, connector 730 may extend between first weighted ballast 780 and second weighted ballast 785. First end 742 of connector 730 may be connected to first weighted ballast 780 and a second and 744 of connector 730 may be connected to second weighted ballast 785. As also illustrated in FIG. 7, the exemplary connector 730 may have a generally triangular shape such that the connector may extend over peak 708 of roof 702.

In some embodiments, the first weighted ballast and the second weighted ballast are connectable to the at least one connector in a manner permitting adaption of the support system to a plurality of roof angles. As discussed above, a first end of the connector may be connected to the first weighted ballast and the second end of the connector may be connected to the second weighted ballast. As also discussed above, the connector may be connected at each end to the first weighted ballast and second weighted ballast via fasteners that may allow relative rotation of the connector with respect to the first weighted ballast and/or the second weighted ballast. For example, the connector may be connected to the first weighted ballast using pivotable joint that may allow the connector to rotate relative to the first weighted ballast. The connector may be connected to the second weighted ballast in a similar manner. Thus, by allowing the connector to rotate relative to the first weighted ballast and the second weighted ballast or vice versa the disclosed support system may allow the first weighted ballast and the second weighted ballast to be inclined at any desired angle relative to the connector and consequently relative to the ground surface. This may allow the support system to be mounted on roofs having different angles of inclination between the first angled surface and the second angled surface of the roof. Furthermore, by allowing the connector to be rotatable relative to the first and second weighted ballast, it may be possible to maintain the connector generally parallel to the ground surface, allowing the connector to provide a relatively flat shelf. This in turn may allow the wind turbines to be attached to the connector such that the turbines are oriented generally perpendicular to the connector and the ground surface regardless of the angle between the first and second angled surfaces of the roof.

By way of a nonlimiting example, FIG. 7 illustrates first weighted ballast 780 and second weighted ballast 785 positioned above first angled surface 704 and second angled surface 706, respectively, of roof 702. First end 742 of connector 730 may be connected to first weighted ballast 780 by a pivotable connection that may allow rotation of first weighted ballast 780 relative to connector 730, which may also allow rotation of first weighted ballast 780 relative to the ground surface. Likewise, second end 744 of connector 730 may be connected to second weighted ballast 785 by a pivotable connection that may allow rotation of second weighted ballast 785 relative to connector 730, which may also allow rotation of second weighted ballast 785 relative to the ground surface. Because the first weighted ballast 780 and second weighted ballast 785 may be rotated related to connector 730, first weighted ballast 780 and second weighted ballast 785 may still be able to rest on first angled surface 704 and second angled surface 706 of roof 702 for a variety of roof angles 746.

In some embodiments, the first weighted ballast includes a first portion extending beyond the peak above the second angled surface, the second weighted ballast includes a second portion extending beyond the peak above the first angled surface such that the first portion and the second portion crisscross, and wherein the at least one connector extends between the first portion and the second portion to form at least one substantially horizontal shelf spaced above the peak. In some of the embodiments discussed above, the first weighted ballast and the second weighted ballast have been described and illustrated as generally terminating at or adjacent to the peak of a roof of a building with the connector extending over the peak and connecting the first weighted ballast and the second weighted ballast. It is contemplated, however, that in some embodiments the first weighted ballast may be disposed on first angled surface of the roof and may extend beyond the peak of the roof such that at least some portion of the first weighted ballast may be disposed above the second angled surface of the roof. Likewise, the second weighted ballast may be disposed on the second angled surface of the roof and may extend beyond the peak of the roof such that at least some portion of the second weighted ballast may be disposed above the first angled surface of the roof. Thus, the first weighted ballast and the second weighted ballast may form an "X" shaped or crisscross structure. It is further contemplated that the connector may have a first end connected to the first weighted ballast and the second end connected to the second weighted ballast as described above. It will be understood that because the first weighted ballast and the second weighted ballast extend beyond the peak of the roof, the connector that connects the free ends of the first weighted ballast and the second weighted ballast that extend beyond the peak of the roof may be disposed above the peak. That is, the connector may be disposed of at a height relative to the ground surface that may be larger than the height of the peak of the roof relative to the ground surface.

Figure 9A:
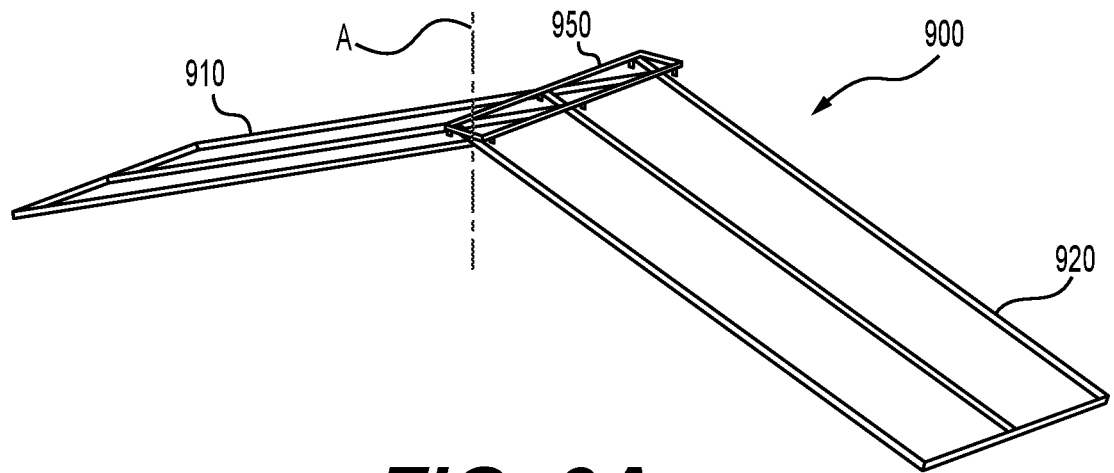
FIGS. 9A and 9B illustrate another exemplary support system for positioning a wind turbine above a roof of a building using weighted ballasts, consistent with disclosed embodiments.
Figure 9B:
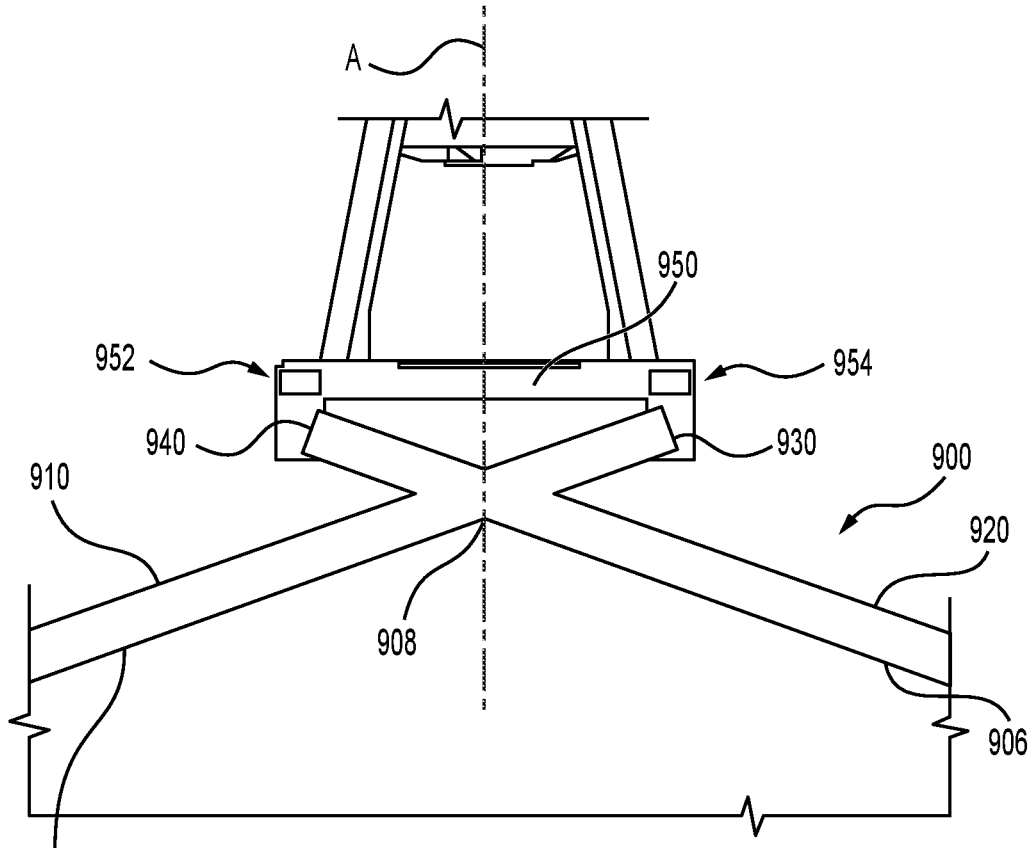

By way of a nonlimiting example, FIGS. 9A and 9B illustrate support system 900 and may include first weighted ballast 910 and second weighted ballast 920. As also illustrated in FIGS. 9A and 9B, first weighted ballast 910 may be positioned along first angled surface 904 of roof 902 and may extend beyond a vertical axis "A" of peak 908 and past peak 908 of roof 902 to distal end 930 of first weighted ballast a 910. Similarly, second weighted ballast 920 may be positioned along second angled surface 906 and may extend beyond the vertical axis A of peak 908 and past peak 908 of roof 902 to distal end 940 of second weighted ballast 920 to form an X-shaped arrangement with distal ends 930 and 940 being spaced apart from each other at a height above peak 908. First end 952 of connector 950 may be connected to second free end 940 of second weighted ballast 920, and second end 954 of connector 950 may be connected to first free end 930 of first weighted ballast 910. As also illustrated in the exemplary embodiments of FIGS. 9A and 9B, connector 950 may form the horizontal shelf space and may be disposed above peak 908 of roof 902. That is, a height of connector 950 relative to a ground surface may be greater than a height of peak 908 relative to the ground surface.

In some embodiments, the first weighted ballast and the second weighted ballast are connectable to the at least one connector such that the at least one connector is disposed horizontally, parallel to the ground surface for the plurality of roof angles. For example, the first weighted ballast and the second weighted ballast may be connected to the connector using fasteners such that the first and second weighted ballasts may be rotatable relative to the connector. Doing so may allow the first weighted ballast and the second weighted ballast to be angled relative to each other at an angle that matches that angle between the first and second angled surfaces of the roof. Further, doing so may allow the connector to maintained generally parallel to the ground surface or in a relatively horizontal orientation.

Figure 10A:
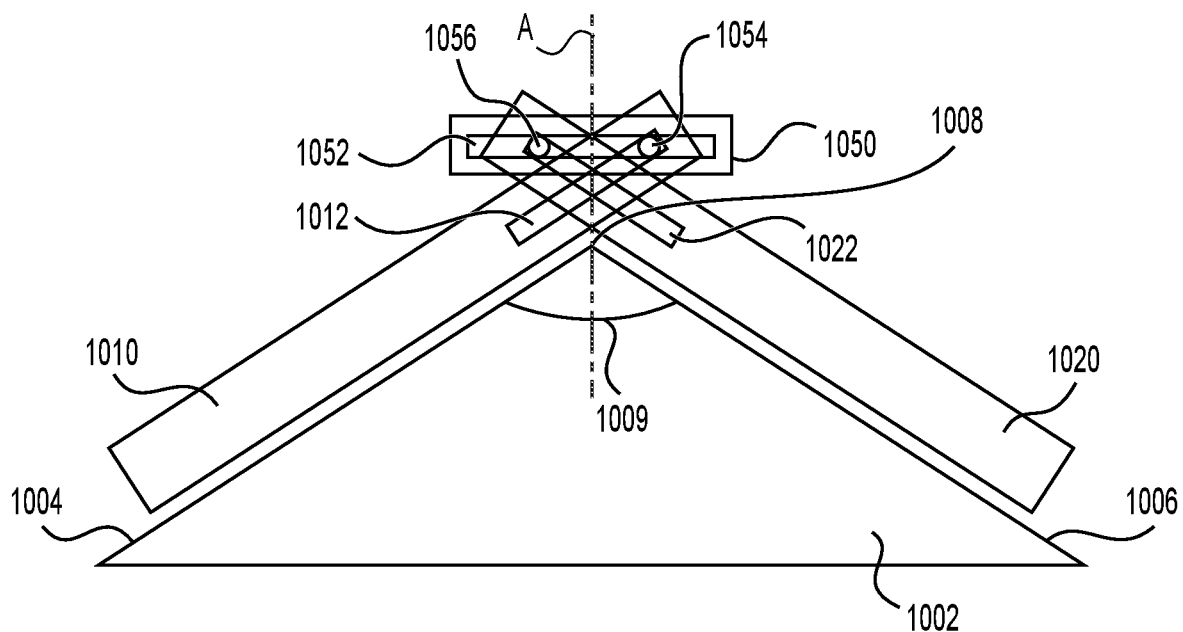
FIGS. 10A and 10B illustrate an exemplary arrangement for connecting the weighted ballasts rotatably to the connector, consistent with disclosed embodiments.
Figure 10B:
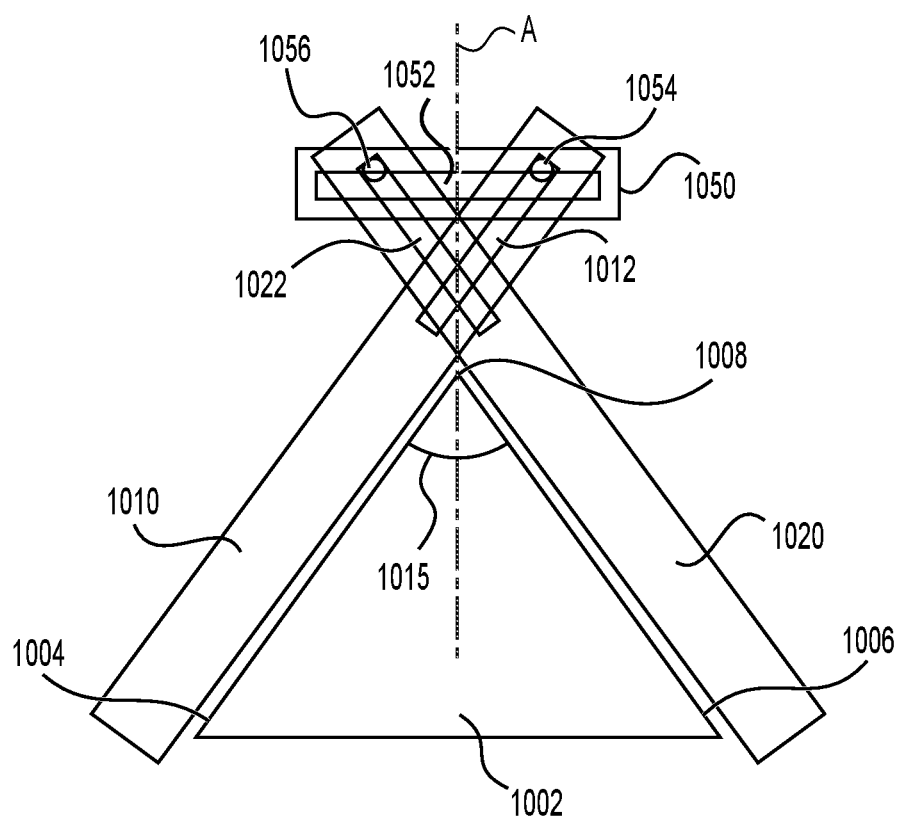

By way of a nonlimiting example, FIGS. 10A and 10B illustrate one exemplary connection method that may allow the first and second weighted ballasts to be rotatable relative to the connector. For example, as illustrated in FIG. 10A, first weighted ballast 1010 may be disposed on first angled surface 1004 and second weighted ballast 1020 may be disposed on second angled surface 1006 of roof 1002. As illustrated in FIG. 10A, first angled surface 1004 and second angled surface 1006 may be disposed at an angle 1009 relative to each other. First weighted ballast 1010 may extend beyond a vertical axis A or peak 1008 and past peak 1008 and second weighted ballast 1020 may extend beyond the vertical axis A of peak 1008 and past peak 1008 similar to the weighted ballasts 910 and 920 discussed above with respect to FIGS. 9A and 9B to form an X-shaped arrangement with distal ends of the weighted ballasts 1010 and 1020 spaced apart from each other at a height above peak 1008. First weighted ballast 1010 may include an elongated slot 1012 and second weighted ballast 1020 may include an elongated slot 1022. First and second weighted ballasts may be connected to connector 1050 that may also have an elongated slot 1052 that my overlap with slots 1012 and 1022. Bolt 1054 may extend through slot 1012 of first weighted ballast 1010 and slot 1052 of connector 1050. Likewise, bolt 1056 may extend through slot 1022 of second weighted ballast 1020 and slot 1052 of connector 1050. Thus, bolt 1054 may allow first weighted ballast 1010 to slide and rotate relative to connector 1050. Likewise, bolt 1056 may allow second weighted ballast 1020 to slide and rotate relative to connector 1050. This may allow connector 1050 to be oriented generally parallel to the ground surface and perpendicular to a direction of gravity so that wind turbines attached to connector 1050 may be disposed generally vertically (parallel to a direction of gravity) regardless of the value of angle 1009 between first and second angled surfaces 1004 and 1006 of roof 1002.

This is illustrated in FIG. 10B in which first angled surface 1004 is disposed at an angle 1019 relative to second angled surface 1006 and angle 1019 is smaller than angle 1009 illustrated in FIG. 10A. As illustrated in FIG. 10B, bolts 1054 and 1056 and slots 1012, 1022, and 1052 permit the first weighted ballast 1010, second weighted ballast 1020, and connector 1050 to slide relative to each other. As a result, connector 1050 can be maintained horizontal (e.g., generally parallel to the ground surface) regardless of the angle 1009 or 1019 of roof 1002. Bolts 1054 and 1056 may be equipped with nuts that may be tightened once connector 1050 has been oriented horizontally.

Some embodiments involved at least one mounting portion on the at least one connector for securing at least one wind turbine to the at least one connector. A mounting portion of a structure may refer to a device, fixture, or assembly that may allow attachment of an object to the structure. The mounting portion may include for example a bracket, a clamp, or any other apparatus (e.g., plate with holes to receive fasteners) that may allow attachment of an object to a structure. Securing may refer to attaching or connecting. In some embodiments the connector may include one or more mounting portions (e.g., device, assembly, and/or fixture) that may allow for connection or attachment of an object (e.g., wind turbine) to the connector. It is contemplated that the connector may include any number of mounting portions. In some embodiments, the mounting portion may be separate and distinct from the connector and may be connected to the connector using one or more fastening mechanism described above (e.g., bolts, nuts, screws, clamps, hooks, welding, brazing, soldering). In some embodiments, the mounting portion may be an integral portion of the connector. Each mounting portion may allow for attachment of a separate wind turbine to the connector. It is contemplated, however, that in some embodiments, more than one mounting portion may be used to attach a single wind turbine to the connector. In some embodiments, the at least one mounting portion is configured to support at least one vertical axis wind turbine. As discussed above a wind turbine may be a vertical axis wind turbine or a horizontal axis wind turbine. It is contemplated that the one or more mounting portions on the one or more connector's may be configured to secure (e.g., connector or attached) either a horizontal axis wind turbine or a vertical axis wind turbine to the mounting portion.

Figure 11:
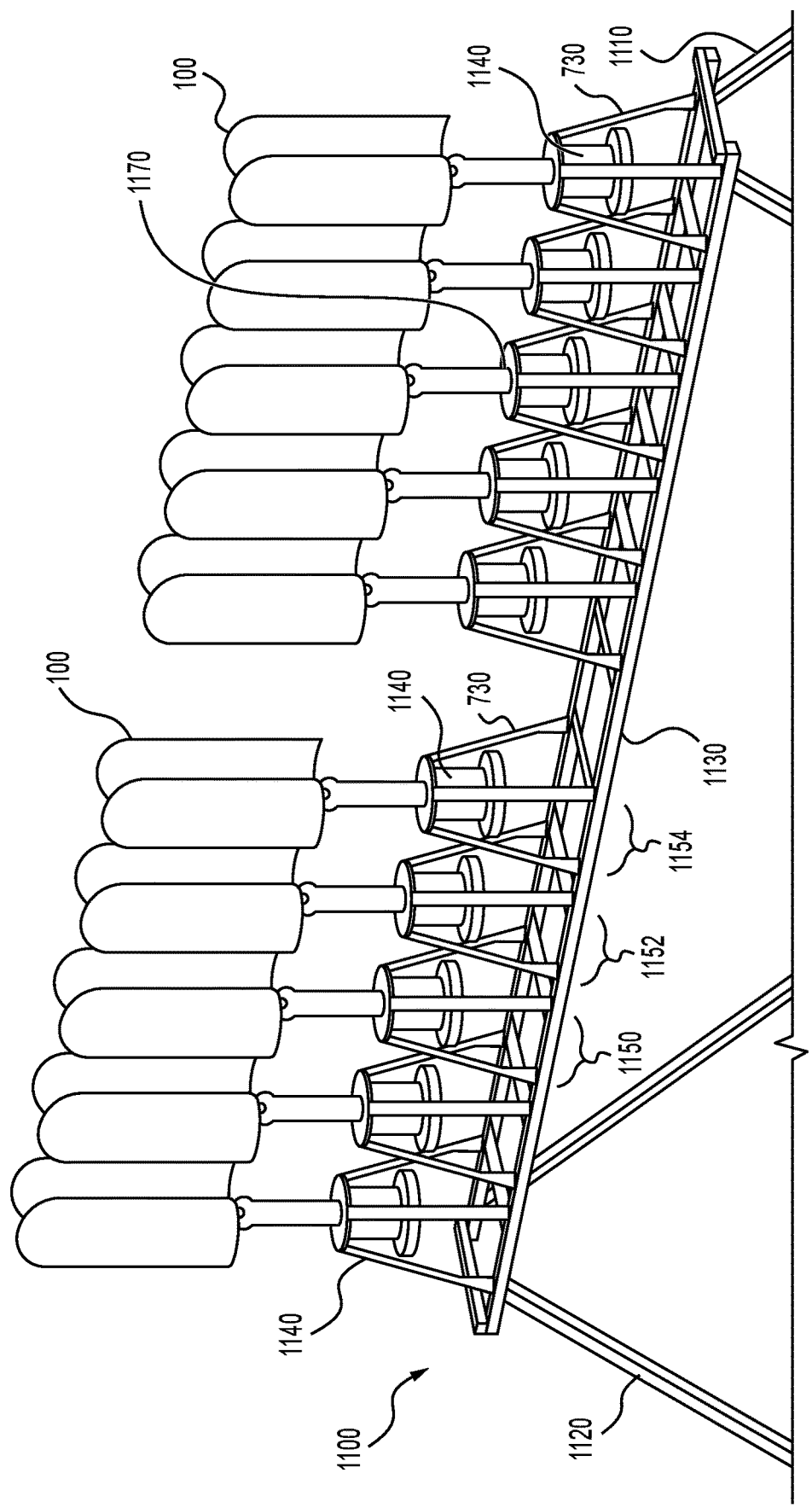
FIG. 11 illustrates another exemplary support system for positioning a wind turbine above a roof of a building using weighted ballasts, consistent with disclosed embodiments.

By way of a nonlimiting example, FIG. 11 illustrates support system 1100 that may include first weighted ballast 1110, second weighted ballast 1120, and connector 1130 extending between and connected to first weighted ballast 1110 and second weighted ballast 1120. As also illustrated in FIG. 11, support system 1100 may include one or more mounting portions 1140. The one or more mounting portions 1140 may be connected to connector 1130, using one or more fastening mechanisms described above. As also illustrated in FIG. 11, wind turbine 100 may be secured (e.g., connected or attached) to mounting portion 1140. In some exemplary embodiments, as illustrated in FIG. 11 wind turbine 100 may be a vertical axis wind turbine 100 attached to mounting portion 1140. By way of another nonlimiting example, FIG. 7 illustrates first weighted ballast 710 and second weighted ballast 720 disposed on first angled surface 704 and second angled surface 706 of roof 702. Connectors 730 may extend over peak 708 of roof 702 and may connect first weighted ballast 710 with second weighted ballast 720. Each of connector 730 may include a mounting portion 1140 that may allow for attachment of one wind turbine 100 to connector 730.

In some embodiments, the at least one connector includes a plurality of regions for supporting a plurality of mounting portions to secure a plurality of wind turbines to the plurality of regions of the at least one connector. In some embodiments, the at least one connector includes three separate portions for supporting three wind turbines. As discussed above, the disclosed support system may include a connector extending between and connecting a first weighted ballast and the second weighted ballast. As also discussed above, the connector may include one or more mounting portions that may allow for attachment of one, two, three, or more wind turbines to the connector. In some embodiments, the connector may include a plurality of mounting portions attached to a plurality of regions or sections of the connector. Each of the plurality of mounting portions may be configured to allow for attachment of a separate and distinct wind turbine to the connector. Thus, for example, as illustrated in the exemplary embodiment of FIG. 11, connector 1130 may include a plurality of regions 1150, 1152, 1154, etc. Each region, for example, 1150, 1152, 1154 may be associated with a mounting portion 1140. As also illustrated in FIG. 11, a separate and distinct wind turbine 100 may be attached to each of the plurality of mounting portions 1140 disposed on connector 1130.

In some embodiments, the first weighted ballast and the second weighted ballast are sized and weighted to maintain the at least one wind turbine above the peak during wind conditions. As discussed above, the support system for attaching one or more wind turbines to a roof may include a first weighted ballast and a second weighted ballast that may be positioned on a first angle surface and a second angle surface, respectively, of the roof. As also described above, the first weighted ballast and the second weighted ballast may each provide or contribute to weight of the support system that may help to position the first weighted ballast and the second weighted ballast on the first angled surface and the second angled surface of the roof such that the support system including the first weighted ballast and the second weighted ballast may not move from their positions when subjected to wind conditions. As further described above, the support system may include one or more connectors connected to the first weighted ballast and the second weighted ballast. The connectors may provide for one or more mounting portions that may allow for attachment to one or more wind turbines to the support system. In some embodiments, the weight provided by the first weighted ballast and the second weighted ballast may be such that, when subjected to wind conditions the weight may prevent movement of the first weighted ballast and the second weighted ballast from their initial positions on the roof. By doing so, the first weighted ballast and the second validated ballast may also ensure that the wind turbines attached to the support system are positioned above the peak of the roof.

By way of example, FIG. 7 illustrates support system 700 including first weighted ballast 710 and second weighted ballast 720 disposed on first angle surface 704 and second angle surface 706, respectively, of roof 702. As also illustrated in FIG. 7 each of first weighted ballast 710 and second weighted ballast 720 includes weights 714, 724 that may be configured to position first weighted ballast 710 and second weighted ballast 720 on the roof 702 such that when exposed to wind conditions, support system 600 may not move from its initial position on the roof 702. As also discussed above, support system 700 may include one or more connectors 730 that may allow for attachment of wind turbines 100 to support system 700. It is contemplated that the weight provided by weights 714, 724 to first weighted ballast 710 and second weighted ballast 720 may be such that when the wind turbines 100 mounted on connectors 730 are subjected to wind conditions, the forces exerted by the wind on the wind turbines and consequently on support system 700 are not sufficient to move first weighted ballast 710 and second weighted ballast 720 from their original positions on the roof 702. As a result the position of wind turbines 100 above peak 708 of roof 702 may be unchanged when subjected to wind conditions.

Some embodiments involve at least one vibration absorbing element for location between the at least one wind turbine and the mounting portion. Vibration may refer to rapid motion of one or more parts of the structure caused due to an exciting force or movement of another attached structure. As discussed above, one or more wind turbines may be attached to a support system that may be positioned on the roof of a building. Wind conditions or flow of air across the one or more blades of the wind turbines may cause the wind turbines to rotate. Rotation of the wind turbines may also induce vibrations in the one or more portions of the support system. Such vibrations may additionally or alternatively be transferred to the roof of the building, which may generate noise or otherwise cause discomfort to one or more persons residing in the building. Additionally, vibrations transferred to the roof and/or other portions of the building may have the potential to cause damage to the roof and/or the building. Therefore, it may be desirable to attenuate or reduce the amount of vibration being transferred to the support system and/or to the roof of the building. Vibration absorbing elements may include devices or materials that may provide inertia, stiffness, and/or dampening elements which may be capable of absorbing amplitude and/or energy associated with the vibration at the connection point between the vibrating and non-vibrating components. Vibration absorbing elements may include, for example, a pneumatic or air isolator, mechanical springs, spring dampers, pads or sheets of flexible materials such as elastomers, rubber, cork, and/or laminate materials, molded and bonded rubber and elastomeric materials, or any other material capable of absorbing and dampening the movements and/or energy associated with vibration. In some embodiments, one or more vibration absorbing elements may be positioned at the connection point between the wind turbine and the mounting portion of the connector of the support system. Including a vibration absorbing element at the connection point may help to reduce the amount of vibration that may be transmitted from a rotating wind turbine to the support system and therefore to the roof of the building. By way of a non-limiting example, as illustrated in FIG. 11, a pad or sleeve 1170 of flexible material may be inserted at the connection point between wind turbine 100 and mounting portion 1140 of connector 730. Doing so may help reduce an amount of vibration that may be transmitted from wind turbine 100 through connector 730 to support system 1100 and/or to roof 1102.

Some embodiments involve a plurality of vibration absorbing elements associated with each of the first weighted ballast and the second weighted ballast for absorbing vibrations from the at least one wind turbine. As discussed above, one or more vibration absorbing elements may be included between a wind turbine and the support system position on the roof of a dwelling to help reduce the amount of vibrations transmitted from a rotating wind turbine to, for example, the roof of the dwelling. Additionally or alternatively, in some embodiments, vibration absorbing elements may also be included in between the first weighted ballast and the first angled portion of the roof, and/or between the second weighted ballast and the second angle portion of the roof. As discussed above, the first weighted ballast and the second weighted ballast may be in contact with the first angled surface and the second angled surface, respectively, of the roof. Thus, any vibration transmitted by a wind turbine to the support system may also be transmitted to the roof due to the contact of the first weighted ballast and the second weighted ballast with the roof. In some embodiments, one or more vibration absorbing elements, as discussed above, may be positioned between the first weighted ballast and the first angled portion of the roof and/or between the second weighted ballast and the second angled portion of the roof. For example, referring to FIG. 7, one or more vibration absorbing elements (e.g., pneumatic or air isolators, or flexible sheets) may be positioned between weight 714 and first angled surface 704 of roof 702. Likewise one or more vibration absorbing elements may be positioned between weight 724 and second angled surface 706 of roof 702. It should be understood that the vibration absorbing elements may also provide additional frictional resistance to help maintain the weighted ballasts in position on the roof.

Figure 12:
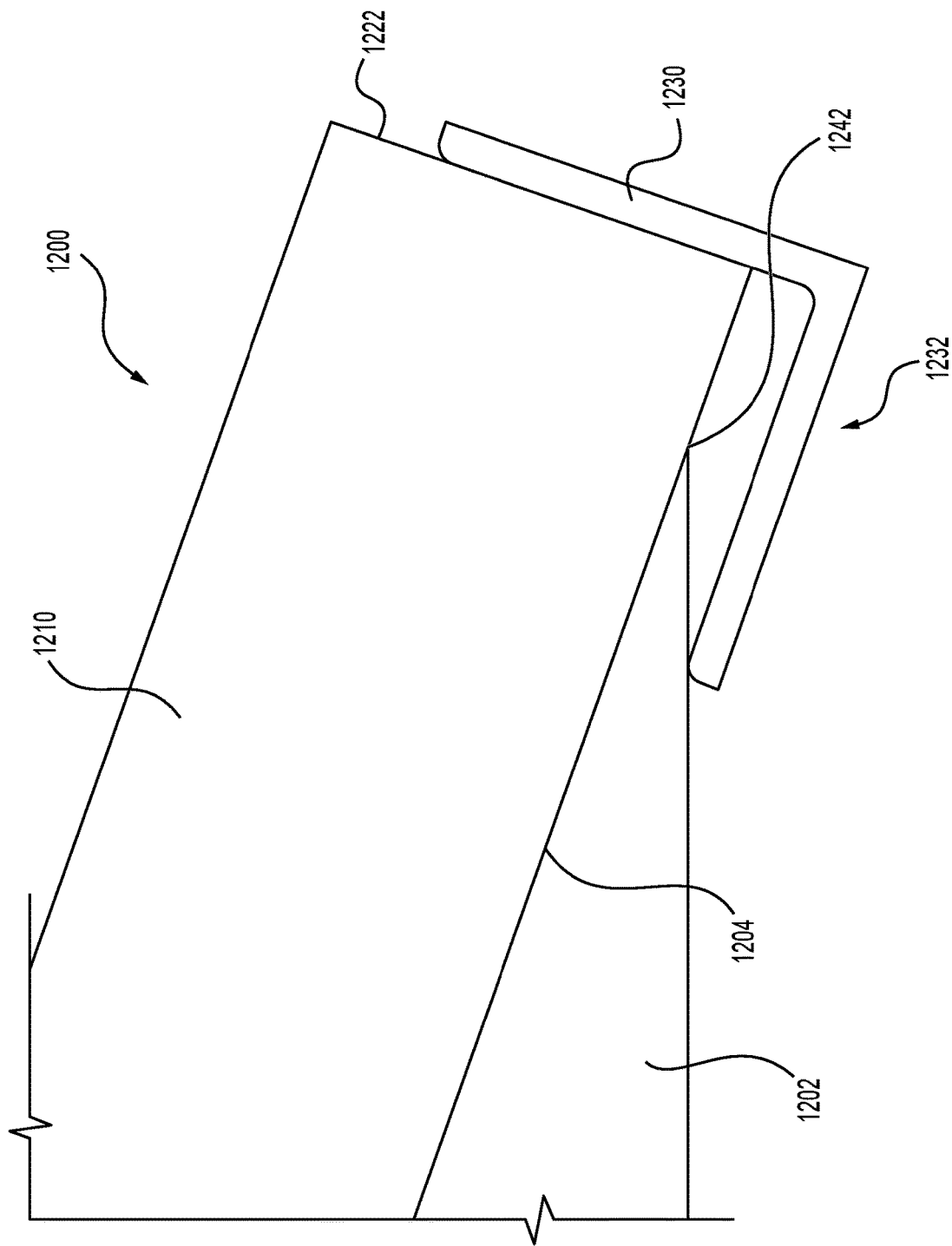
FIG. 12 illustrates another exemplary support system for positioning a wind turbine above a roof of a building using weighted ballasts and hooks, consistent with disclosed embodiments.

Some embodiments involve at least one hook for securing an edge of at least one of the first weighted ballast and the second weighted ballast to an edge of at least one of the first angled surface and the second angled surface. A hook may refer to a curved or sharply bent device that may be used to catch, drag, suspend, or fasten something else. In some embodiments the hook may be made of metal. It is contemplated however that the hook may be made of any other rigid material. An edge may refer to a border or a side where an object or area begins or ends. An edge of the first weighted ballast may refer to a border or side of the first weighted ballast where the first weighted ballast ends. An edge of the second weighted ballast may be similar. As discussed above, a support system for connecting one or more wind turbines to a roof may be positioned on the roof using the first weighted ballast and the second weighted ballast. The first weighted ballast and the second weighted ballast may provide sufficient weight to hold down support system on the roof without the need for any fasteners. In some embodiments, however, it may be beneficial to further ensure that the first weighted ballast and the second weighted ballast are attached to the roof of the dwelling. For example, attaching the first weighted ballast and the second weighted ballast to the roof may be desirable or necessary, at least in geographies where the wind turbines may be subjected to extremely high wind speeds (e.g., for example gale force winds, storms, or hurricanes—above 70 mph). In some embodiments, a hook may be used to attach the edges or borders of the first weighted ballast and/or the second weighted ballast to a corresponding edge or border of the roof. By way of nonlimiting example, FIG. 12 illustrates roof 1202 having a support system 1200 for positioning one or more wind turbines on roof 1202. Support system 1200 may include first weighted ballast 1210 positioned on first angled surface 1204 of roof 1202. First weighted ballast 1210 may include edge 1222. Hook 1230 may be attached to edge 1222 of first weighted ballast 1210. At least a portion 1232 of hook 1230 may be attached adjacent to an edge 1242 of roof 1202. In some embodiments, portion 1232 of hook 1230 may curve around edge 1242 of roof 1202. In some embodiments, portion 1232 of hook 1230 may be attached adjacent to edge 1242 of roof 1202 via one or more fasteners (e.g., bolts, nuts, screws, rivets, clamps) and/or by welding, brazing, or any other means of attachment.

Figure 13:
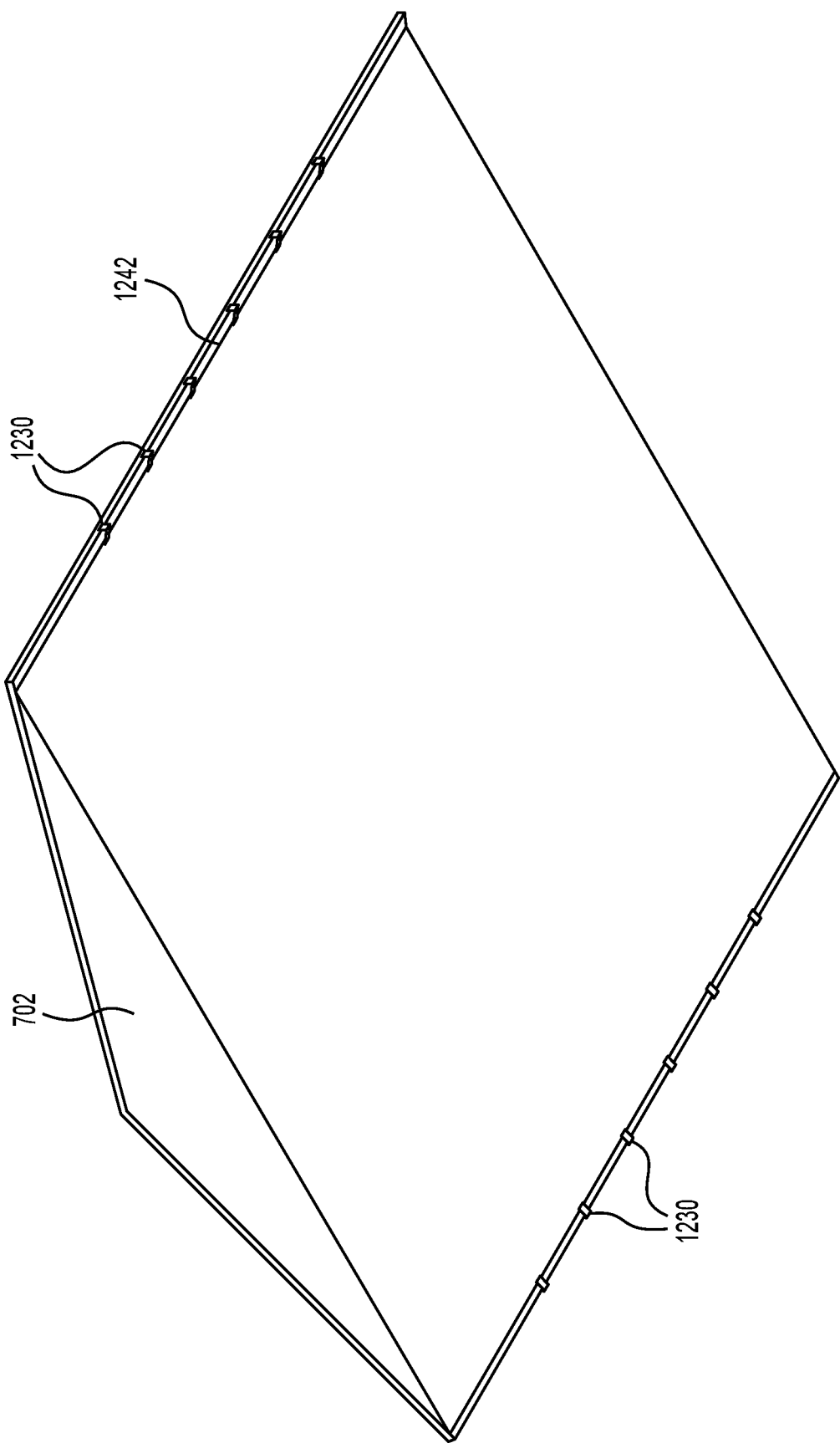
FIG. 13 illustrates another exemplary support system for positioning a wind turbine above a roof of a building using weighted ballasts and hooks, consistent with disclosed embodiments.

In some embodiments, the at least one hook includes a plurality of hooks. As discussed above, in some embodiments one or more hooks may be used to attach an edge of the first weighted ballast or the second weighted ballast when edge of the roof. It is contemplated that any number of hooks may be used to attach an edge of the first weighted ballast and/or and edge of the second weighted ballast to a corresponding edge of the roof. By way of nonliming example FIG. 13 illustrates roof 702 having a support system 700 for positioning one or more wind turbines on roof 702. As illustrated in FIG. 13, a plurality of hooks 1230 may be attached at one end to edge 1222 (see FIG. 12) of first weighted ballast 710 with an opposite end of hooks 1230 attached to an edge 1242 of roof 702.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Moreover, while illustrative embodiments have been described herein, the scope may include any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A support system for securing a wind turbine above an angled roof having a first angled surface, an opposite second angled surface, and a peak between the first angled surface and the second angled surface, the support system comprising:
   a first weighted ballast configured for location along a portion of the first angled surface and including a first portion configured to extend beyond a vertical axis of the peak;
   a second weighted ballast configured for location along a portion of the second angled surface and including a second portion configured to extend beyond the vertical axis of the peak and to form, relative to the first portion, an X arrangement with distal ends of each of the first portion and the second portion being spaced from each other at a height above the peak;
   at least one connector extending between and connecting a distal end of the first portion of the first weighted ballast and a distal end of the second portion of the second weighted ballast, the at least one connector extending over the peak; and
   at least one mounting portion on the at least one connector for securing at least one wind turbine to the at least one connector, wherein the first weighted ballast and the second weighted ballast are sized and weighted to maintain the at least one wind turbine above the peak during wind conditions.

2. The support system of claim 1, wherein the first weighted ballast and the second weighted ballast are configured to maintain the at least one wind turbine above the peak during the wind conditions and in an absence of fasteners securing at least one of the first weighted ballast to the first angled surface or the second weighted ballast to the second angled surface.

3. The support system of claim 1, wherein at least one of the first and the second weighted ballasts is configured to support solar panels thereon, and wherein weights of the solar panels contribute to a weight of the at least one of the first and the second weighted ballasts.

4. The support system of claim 1, wherein the at least one connector includes a plurality of regions for supporting a plurality of mounting portions to secure a plurality of wind turbines to the plurality of regions of the at least one connector.

5. The support system of claim 1, wherein the first weighted ballast and the second weighted ballast are connectable to the at least one connector in a manner permitting adaptation of the support system to a plurality of roof angles.

6. The support system of claim 5, wherein the first weighted ballast and the second weighted ballast are connectable to the at least one connector such that the at least one connector is disposed horizontally, parallel to the ground surface for the plurality of roof angles.

7. The support system of claim 6, wherein
   the first weighted ballast includes a first elongated slot,
   the second weighted ballast includes a second elongated slot,
   the connector includes a third elongated slot,
   the first weighted ballast and the connector are configured such that at least a portion of the first elongated slot overlaps with the third elongated slot and a first fastener extends through overlapping portions of the first elongated slot and the third elongated slot, and
   the second weighted ballast and the connector are configured such that at least a portion of the second elongated slot overlaps with the third elongated slot and a second fastener extends through overlapping portions of the second elongated slot and the third elongated slot.

8. The support system of claim 1, further including at least one hook for securing an edge of at least one of the first weighted ballast and the second weighted ballast to an edge of at least one of the first angled surface and the second angled surface.

9. The support system of claim 1, further comprising at least one vibration absorbing element for location between the at least one wind turbine and the mounting portion.

10. The support system of claim 1, further comprising a plurality of vibration absorbing elements associated with each of the first weighted ballast and the second weighted ballast for absorbing vibrations from the at least one wind turbine.

11. The support system of claim 1, wherein the first weighted ballast and the second weighted ballast each include at least two side bars for extending in an angled direction and at least two cross bars for extending transverse to the angled direction.

12. The support system of claim 11, further comprising a plurality of adjustable legs associated with each of the sidebars, and for supporting the first weighted ballast and the second weighted ballast at a spaced distance from the first angled surface and the second angled surface.

13. The support system of claim 1, wherein each of the first weighted ballast and the second weighted ballast incudes:
   a right lower sidebar for extending in an angled direction;
   a right upper sidebar for extending in an angled direction;
   a left lower sidebar for extending in an angled direction;
   a left upper sidebar for extending in an angled direction; and
   a plurality of crossbars extending transverse to the angled direction and connecting on one end thereof the right lower sidebar to the right upper sidebar and on another end thereof the left lower sidebar to the left upper sidebar.

14. The support system of claim 13, wherein the at least some of the crossbars include an integrated support for weighting tiles.

15. The support system of claim 13, wherein a plurality of adjustable legs are configured for connection to the right lower sidebar and the left lower sidebar for maintaining the right lower sidebar and the left lower sidebar a spaced distance from an associated one of the first angled surface and the second angled surface.

16. The support system of claim 1, further comprising a plurality of additional first weighted ballasts and a plurality of additional second weighted ballasts configured for modular interconnection in order to accommodate roofs of varying sizes.

17. The support system of claim 16, wherein the first weighted ballast includes a plurality of weighted sections configured to be joined at an upper portion thereof by a common crossbar.

18. The support system of claim 17, wherein the common crossbar is configured to extend between two weighted sections, and wherein the at least one connector includes three separate portions for supporting three wind turbines.

19. The support system of claim 17, wherein each of the plurality of weighted sections is configured to support a separate solar panel portion thereon.

20. The support system of claim 1, wherein the at least one mounting portion is configured to support at least one vertical axis wind turbine.

21. The support system of claim 1, wherein each weighted ballast includes a portion for receiving at least one rigid weight thereon.

22. The support system of claim 1, wherein each weighted ballast includes a portion for receiving at least one flexible weight thereon.

23. A support system for securing a wind turbine above an angled roof having a first angled surface, an opposite second angled surface, and a peak between the first angled surface and the second angled surface, the support system comprising:
   a first weighted ballast configured for location along a portion of the first angled surface, the first weighted ballast including a first elongated slot;
   a second weighted ballast configured for location along a portion of the second angled surface, the second weighted ballast including a second elongated slot;
   at least one connector configured to be connected to the first weighted ballast and the second weighted ballast via the first elongated slot and the second elongated slot, respectively, wherein the connector is configured to extend between the first weighted ballast and the second weighted ballast over the peak; and
   at least one mounting portion on the at least one connector for securing at least one wind turbine to the at least one connector, wherein the first weighted ballast and the second weighted ballast are sized and weighted to maintain the at least one wind turbine above the peak during wind conditions.

24. A support system for securing a wind turbine above an angled roof having a first angled surface, an opposite second angled surface, and a peak between the first angled surface and the second angled surface, the support system comprising:
   a first weighted ballast configured for location along a portion of the first angled surface;
   a second weighted ballast configured for location along a portion of the second angled surface;
   at least one connector extending between and connecting a portion of the first weighted ballast and a portion of the second weighted ballast, the at least one connector extending over the peak; and
   at least one mounting portion on the at least one connector for securing at least one wind turbine to the at least one connector, wherein the first weighted ballast and the second weighted ballast are sized and weighted to maintain the at least one wind turbine above the peak during wind conditions,
   wherein at least one of the first weighted ballast and the second weighted ballast includes at least one receptacle for receiving at least one weighted tile configured to provide a weight to the at least one of the first weighted ballast and the second weighted ballast.

* * * * *

UNITED STATES PATENT AND TRADEMARK OFFICE
CERTIFICATE OF CORRECTION

PATENT NO. : 11,933,267 B2
APPLICATION NO. : 18/298584
DATED : March 19, 2024
INVENTOR(S) : Mark Daniel Farb et al.

Page 1 of 1

It is certified that error appears in the above-identified patent and that said Letters Patent is hereby corrected as shown below:

In the Claims

In Claim 13, Column 24, Lines 49-50, "incudes:" should read --includes:--.

Signed and Sealed this
Eleventh Day of June, 2024

Katherine Kelly Vidal
*Director of the United States Patent and Trademark Office*